(12) United States Patent
Daniels et al.

(10) Patent No.: US 9,027,296 B2
(45) Date of Patent: May 12, 2015

(54) GYPSUM COMPOSITES USED IN FIRE RESISTANT BUILDING COMPONENTS

(71) Applicant: Intellectual Gorilla B.V., Amsterdam (NL)

(72) Inventors: Evan R. Daniels, Frisco, TX (US); Jonathan Newton, Dallas, TX (US)

(73) Assignee: Intellectual Gorilla B.V., Amsterdam (NL)

( * ) Notice: Subject to any disclaimer, the term of this patent is extended or adjusted under 35 U.S.C. 154(b) by 0 days.

(21) Appl. No.: 14/543,001

(22) Filed: Nov. 17, 2014

(65) Prior Publication Data

US 2015/0089889 A1    Apr. 2, 2015

Related U.S. Application Data

(60) Division of application No. 13/610,542, filed on Sep. 11, 2012, now Pat. No. 8,915,033, which is a continuation-in-part of application No. 13/603,405, filed on Sep. 4, 2012, which is a continuation-in-part of application No. 13/538,788, filed on Jun. 29, 2012, and a continuation-in-part of application No. 13/538,828, filed on Jun. 29, 2012.

(51) Int. Cl.
*E04C 2/00* (2006.01)
*E06B 5/16* (2006.01)
*E04B 1/94* (2006.01)

(52) U.S. Cl.
CPC . *E06B 5/16* (2013.01); *E04B 1/941* (2013.01); *E04B 1/942* (2013.01); *E06B 5/164* (2013.01)

(58) Field of Classification Search
None
See application file for complete search history.

(56) References Cited

U.S. PATENT DOCUMENTS

| | | | |
|---|---|---|---|
| 570,391 | A | 10/1896 | Fox |
| 1,048,923 | A | 12/1912 | Wheeler |
| 3,517,468 | A | 6/1970 | Woods |
| 3,908,062 | A | 9/1975 | Roberts |
| 3,987,600 | A | 10/1976 | Baehr |

(Continued)

FOREIGN PATENT DOCUMENTS

| | | |
|---|---|---|
| CA | 2799983 A1 | 12/2012 |
| EP | 2189612 A2 | 5/2010 |

(Continued)

OTHER PUBLICATIONS

International Search Report (KIPO) Search Report PCT/US07/04605, Oct. 4, 2007.

(Continued)

*Primary Examiner* — Brian Glessner
*Assistant Examiner* — Paola Agudelo
(74) *Attorney, Agent, or Firm* — Daniel J. Chalker; Edwin S. Flores; Chalker Flores, LLP

(57) ABSTRACT

A composite product includes gypsum in an amount of 60 to 90% by weight, fibers in an amount of 1.5 to 26% by weight substantially homogeneously distributed through the composite, and a rheology-modifying agent in an amount of 0.5 to 6% by weight. The composite is caused or allowed to cure to form a cured composite. The cured composite is a fire resistant component used in a fire-rated door core, a fire-rated door or a fire-rated building panel. The fire resistant component may include a building panel, a door panel, a door core, a door rail, a door stile, a door lock block, a door border, or a door insert.

13 Claims, 12 Drawing Sheets

(56) References Cited

U.S. PATENT DOCUMENTS

| | | | |
|---|---|---|---|
| 3,994,110 A | 11/1976 | Ropella | |
| 4,014,149 A | 3/1977 | Yamamoto | |
| 4,045,937 A | 9/1977 | Stucky | |
| 4,075,804 A | 2/1978 | Zimmerman | |
| 4,084,571 A | 4/1978 | McFarland | |
| 4,159,302 A | 6/1979 | Greve et al. | |
| 4,225,247 A | 9/1980 | Hodson | |
| 4,225,357 A | 9/1980 | Hodson | |
| 4,284,119 A | 8/1981 | Martin et al. | |
| 4,302,127 A | 11/1981 | Hodson | |
| 4,308,065 A | 12/1981 | Walls-Muycelo | |
| 4,339,487 A | 7/1982 | Mullet | |
| 4,343,127 A | 8/1982 | Greve et al. | |
| 4,347,653 A | 9/1982 | Martin et al. | |
| 4,398,842 A | 8/1983 | Hodson | |
| 4,428,775 A | 1/1984 | Johnson et al. | |
| 4,434,899 A | 3/1984 | Rivkin | |
| 4,443,992 A | 4/1984 | Shechter | |
| 4,489,121 A | 12/1984 | Luckanuck | |
| 4,552,463 A | 11/1985 | Hodson | |
| 4,660,338 A | 4/1987 | Wagner | |
| 4,664,707 A | 5/1987 | Wilson et al. | |
| 4,695,494 A | 9/1987 | Fowler et al. | |
| 4,704,834 A | 11/1987 | Turner | |
| 4,716,700 A | 1/1988 | Hagemeyer | |
| 4,716,702 A | 1/1988 | Dickson | |
| 4,800,538 A | 1/1989 | Passmore et al. | |
| 4,811,538 A | 3/1989 | Lehnert et al. | |
| 4,864,789 A | 9/1989 | Thorn | |
| 4,889,428 A | 12/1989 | Hodson | |
| 4,896,471 A | 1/1990 | Turner | |
| 4,922,674 A | 5/1990 | Thorn | |
| 4,944,595 A | 7/1990 | Hodson | |
| 4,946,504 A | 8/1990 | Hodson | |
| 4,998,598 A | 3/1991 | Mardian et al. | |
| 5,061,319 A | 10/1991 | Hodson | |
| 5,074,087 A | 12/1991 | Green | |
| 5,100,586 A | 3/1992 | Jennings et al. | |
| 5,108,677 A | 4/1992 | Ayres | |
| 5,154,358 A | 10/1992 | Hartle | |
| 5,169,566 A | 12/1992 | Stucky et al. | |
| 5,232,496 A | 8/1993 | Jennings et al. | |
| 5,239,799 A | 8/1993 | Bies et al. | |
| 5,242,078 A | 9/1993 | Haas et al. | |
| 5,305,577 A | 4/1994 | Richards et al. | |
| 5,311,381 A | 5/1994 | Lee | |
| 5,317,119 A | 5/1994 | Ayres | |
| 5,339,522 A | 8/1994 | Paquin et al. | |
| 5,344,490 A * | 9/1994 | Roosen et al. | 106/778 |
| 5,347,780 A * | 9/1994 | Richards et al. | 52/204.1 |
| 5,356,579 A | 10/1994 | Jennings et al. | |
| 5,358,676 A | 10/1994 | Jennings et al. | |
| 5,376,320 A | 12/1994 | Tiefenbacher et al. | |
| 5,385,764 A | 1/1995 | Andersen et al. | |
| 5,401,588 A | 3/1995 | Garvey et al. | |
| 5,417,024 A | 5/1995 | San Paolo | |
| 5,433,189 A | 7/1995 | Bales et al. | |
| 5,440,843 A | 8/1995 | Langenhorst | |
| 5,453,310 A | 9/1995 | Andersen et al. | |
| 5,482,551 A | 1/1996 | Morris et al. | |
| 5,505,987 A | 4/1996 | Jennings et al. | |
| 5,506,046 A | 4/1996 | Andersen et al. | |
| 5,508,072 A | 4/1996 | Andersen et al. | |
| 5,514,430 A | 5/1996 | Andersen et al. | |
| 5,522,195 A | 6/1996 | Bargen | |
| 5,527,387 A | 6/1996 | Andersen et al. | |
| 5,540,026 A | 7/1996 | Gartland | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,557,899 A | 9/1996 | Dube et al. | |
| 5,569,514 A | 10/1996 | Ayres | |
| 5,580,409 A | 12/1996 | Andersen et al. | |
| 5,580,624 A | 12/1996 | Andersen et al. | |
| 5,582,670 A | 12/1996 | Andersen et al. | |
| 5,601,888 A * | 2/1997 | Fowler | 428/34 |
| 5,614,307 A | 3/1997 | Andersen et al. | |
| 5,618,341 A | 4/1997 | Andersen et al. | |
| 5,626,954 A | 5/1997 | Andersen et al. | |
| 5,631,052 A | 5/1997 | Andersen et al. | |
| 5,631,053 A | 5/1997 | Andersen et al. | |
| 5,631,097 A | 5/1997 | Andersen et al. | |
| 5,635,292 A | 6/1997 | Jennings et al. | |
| 5,637,412 A | 6/1997 | Jennings et al. | |
| 5,641,584 A | 6/1997 | Andersen et al. | |
| 5,644,870 A | 7/1997 | Chen | |
| 5,653,075 A | 8/1997 | Williamson | |
| 5,654,048 A | 8/1997 | Andersen et al. | |
| 5,658,603 A | 8/1997 | Andersen et al. | |
| 5,658,624 A | 8/1997 | Anderson et al. | |
| 5,660,900 A | 8/1997 | Andersen et al. | |
| 5,660,903 A | 8/1997 | Andersen et al. | |
| 5,660,904 A | 8/1997 | Andersen et al. | |
| 5,662,731 A | 9/1997 | Andersen et al. | |
| 5,665,439 A | 9/1997 | Andersen et al. | |
| 5,665,442 A | 9/1997 | Andersen et al. | |
| 5,676,905 A | 10/1997 | Andersen et al. | |
| 5,679,145 A | 10/1997 | Andersen et al. | |
| 5,679,381 A | 10/1997 | Andersen et al. | |
| 5,683,772 A | 11/1997 | Andersen et al. | |
| 5,691,014 A | 11/1997 | Andersen et al. | |
| 5,695,811 A | 12/1997 | Andersen et al. | |
| 5,702,787 A | 12/1997 | Andersen et al. | |
| 5,705,203 A | 1/1998 | Andersen et al. | |
| 5,705,237 A | 1/1998 | Andersen et al. | |
| 5,705,238 A | 1/1998 | Andersen et al. | |
| 5,705,239 A | 1/1998 | Andersen et al. | |
| 5,705,242 A | 1/1998 | Andersen et al. | |
| 5,707,474 A | 1/1998 | Andersen et al. | |
| 5,709,827 A | 1/1998 | Andersen et al. | |
| 5,709,913 A | 1/1998 | Andersen et al. | |
| 5,711,908 A | 1/1998 | Tiefenbacher et al. | |
| 5,714,217 A | 2/1998 | Andersen et al. | |
| 5,716,675 A | 2/1998 | Andersen et al. | |
| 5,720,142 A | 2/1998 | Morrison | |
| 5,720,913 A | 2/1998 | Andersen et al. | |
| 5,736,209 A | 4/1998 | Andersen et al. | |
| 5,738,921 A | 4/1998 | Andersen et al. | |
| 5,740,635 A | 4/1998 | Gil et al. | |
| 5,749,178 A | 5/1998 | Garmong | |
| 5,753,308 A | 5/1998 | Andersen et al. | |
| 5,766,525 A | 6/1998 | Andersen et al. | |
| 5,776,388 A | 7/1998 | Andersen et al. | |
| 5,782,055 A | 7/1998 | Crittenden | |
| 5,783,126 A | 7/1998 | Andersen et al. | |
| 5,786,080 A | 7/1998 | Andersen et al. | |
| 5,798,010 A | 8/1998 | Richards et al. | |
| 5,798,151 A | 8/1998 | Andersen et al. | |
| 5,800,647 A | 9/1998 | Andersen et al. | |
| 5,800,756 A | 9/1998 | Andersen et al. | |
| 5,810,961 A | 9/1998 | Andersen et al. | |
| 5,830,305 A | 11/1998 | Andersen et al. | |
| 5,830,548 A | 11/1998 | Andersen et al. | |
| 5,843,544 A | 12/1998 | Andersen et al. | |
| 5,849,155 A | 12/1998 | Gasland | |
| 5,851,634 A | 12/1998 | Andersen et al. | |
| 5,868,824 A | 2/1999 | Andersen et al. | |
| 5,879,722 A | 3/1999 | Andersen et al. | |
| 5,887,402 A | 3/1999 | Ruggie et al. | |
| 5,916,077 A | 6/1999 | Tang | |
| 5,928,741 A | 7/1999 | Andersen et al. | |
| 5,976,235 A | 11/1999 | Andersen et al. | |
| 6,030,673 A | 2/2000 | Andersen et al. | |
| 6,067,699 A | 5/2000 | Jackson | |
| 6,083,586 A | 7/2000 | Andersen et al. | |
| 6,090,195 A | 7/2000 | Andersen et al. | |
| 6,115,976 A | 9/2000 | Gomez | |
| 6,119,411 A | 9/2000 | Mateu Gil et al. | |
| 6,161,363 A | 12/2000 | Herbst | |
| 6,168,857 B1 | 1/2001 | Andersen et al. | |
| 6,180,037 B1 | 1/2001 | Andersen et al. | |
| 6,200,404 B1 | 3/2001 | Andersen et al. | |
| 6,231,970 B1 | 5/2001 | Andersen et al. | |

(56) References Cited

U.S. PATENT DOCUMENTS

| | | | |
|---|---|---|---|
| 6,268,022 B1 | 7/2001 | Schlegel et al. | |
| 6,299,970 B1 | 10/2001 | Richards et al. | |
| 6,311,454 B1 | 11/2001 | Kempel | |
| 6,327,821 B1 | 12/2001 | Chang | |
| 6,347,934 B1 | 2/2002 | Andersen et al. | |
| 6,379,446 B1 | 4/2002 | Andersen et al. | |
| 6,402,830 B1 | 6/2002 | Schaffer | |
| 6,434,899 B1 | 8/2002 | Fortin et al. | |
| 6,475,275 B1 * | 11/2002 | Nebesnak et al. | 106/803 |
| 6,494,704 B1 | 12/2002 | Andersen et al. | |
| 6,503,751 B2 | 1/2003 | Hugh | |
| 6,528,151 B1 | 3/2003 | Shah et al. | |
| 6,572,355 B1 | 6/2003 | Bauman et al. | |
| 6,573,340 B1 | 6/2003 | Khemani et al. | |
| 6,581,588 B2 | 6/2003 | Wiedemann et al. | |
| 6,619,005 B1 | 9/2003 | Chen | |
| 6,643,991 B1 * | 11/2003 | Moyes | 52/784.11 |
| 6,665,997 B2 | 12/2003 | Chen | |
| 6,668,499 B2 | 12/2003 | Degelsegger | |
| 6,684,590 B2 | 2/2004 | Frumkin | |
| 6,688,063 B1 | 2/2004 | Lee et al. | |
| 6,696,979 B2 | 2/2004 | Manten et al. | |
| 6,743,830 B2 | 6/2004 | Soane et al. | |
| 6,745,526 B1 | 6/2004 | Autovino | |
| 6,764,625 B2 * | 7/2004 | Walsh et al. | 264/119 |
| 6,766,621 B2 | 7/2004 | Reppermund | |
| 6,779,859 B2 | 8/2004 | Koons | |
| 6,818,055 B2 | 11/2004 | Schelinski | |
| 6,843,543 B2 | 1/2005 | Ramesh | |
| 6,866,081 B1 | 3/2005 | Nordgard et al. | |
| 6,886,306 B2 | 5/2005 | Churchill et al. | |
| 6,890,604 B2 | 5/2005 | Daniels | |
| 6,961,998 B2 | 11/2005 | Furchheim et al. | |
| 6,964,722 B2 | 11/2005 | Taylor et al. | |
| 6,981,351 B2 | 1/2006 | Degelsegger | |
| 7,059,092 B2 | 6/2006 | Harkin et al. | |
| 7,090,897 B2 | 8/2006 | Hardesty | |
| RE39,339 E | 10/2006 | Andersen et al. | |
| 7,185,468 B2 | 3/2007 | Clark et al. | |
| 7,241,832 B2 | 7/2007 | Khemani et al. | |
| 7,279,437 B2 | 10/2007 | Kai et al. | |
| 7,297,394 B2 | 11/2007 | Khemani et al. | |
| 7,386,368 B2 | 6/2008 | Andersen et al. | |
| 7,598,460 B2 | 10/2009 | Roberts, IV et al. | |
| 7,617,606 B2 * | 11/2009 | Robbins et al. | 29/897.32 |
| 7,669,383 B2 * | 3/2010 | Darnell | 52/784.11 |
| 7,721,500 B2 * | 5/2010 | Clark et al. | 52/455 |
| 7,775,013 B2 | 8/2010 | Bartlett et al. | |
| 7,803,723 B2 | 9/2010 | Herbert et al. | |
| 7,832,166 B2 | 11/2010 | Daniels | |
| 7,886,501 B2 | 2/2011 | Bartlett et al. | |
| 7,897,235 B1 | 3/2011 | Locher et al. | |
| 7,927,420 B2 | 4/2011 | Francis | |
| 7,964,051 B2 | 6/2011 | Lynch et al. | |
| 8,037,820 B2 | 10/2011 | Daniels | |
| 8,097,544 B2 | 1/2012 | Majors | |
| 8,209,866 B2 | 7/2012 | Daniels | |
| 8,381,381 B2 | 2/2013 | Daniels | |
| 8,650,834 B2 | 2/2014 | Hardwick et al. | |
| 2002/0053757 A1 | 5/2002 | Andersen et al. | |
| 2002/0078659 A1 | 6/2002 | Hunt | |
| 2002/0100996 A1 | 8/2002 | Moyes et al. | |
| 2002/0124497 A1 | 9/2002 | Fortin et al. | |
| 2002/0128352 A1 | 9/2002 | Soane et al. | |
| 2002/0166479 A1 | 11/2002 | Jiang | |
| 2003/0015124 A1 * | 1/2003 | Klus | 106/772 |
| 2003/0033786 A1 | 2/2003 | Yulkowski | |
| 2003/0084980 A1 | 5/2003 | Seufert et al. | |
| 2003/0115817 A1 | 6/2003 | Blackwell et al. | |
| 2003/0205187 A1 | 11/2003 | Carlson et al. | |
| 2003/0209403 A1 | 11/2003 | Daniels | |
| 2003/0211251 A1 | 11/2003 | Daniels | |
| 2003/0211252 A1 | 11/2003 | Daniels | |
| 2004/0231285 A1 | 11/2004 | Hunt et al. | |
| 2005/0092237 A1 | 5/2005 | Daniels | |
| 2005/0241541 A1 * | 11/2005 | Hohn et al. | 106/805 |
| 2005/0284030 A1 | 12/2005 | Autovino et al. | |
| 2006/0070321 A1 | 4/2006 | Au | |
| 2006/0096240 A1 | 5/2006 | Fortin | |
| 2006/0287773 A1 | 12/2006 | Andersen et al. | |
| 2007/0021515 A1 | 1/2007 | Glenn et al. | |
| 2007/0092712 A1 | 4/2007 | Hodson | |
| 2007/0095570 A1 | 5/2007 | Roberts, IV et al. | |
| 2007/0125043 A1 | 6/2007 | Clark et al. | |
| 2007/0125044 A1 | 6/2007 | Clark et al. | |
| 2007/0157537 A1 | 7/2007 | Nicolson et al. | |
| 2007/0175139 A1 | 8/2007 | Nicolson et al. | |
| 2007/0193220 A1 | 8/2007 | Daniels | |
| 2008/0016820 A1 | 1/2008 | Robbins, Sr. et al. | |
| 2008/0027583 A1 | 1/2008 | Andersen et al. | |
| 2008/0027584 A1 | 1/2008 | Andersen et al. | |
| 2008/0027685 A1 | 1/2008 | Andersen et al. | |
| 2008/0041014 A1 | 2/2008 | Lynch et al. | |
| 2008/0066653 A1 | 3/2008 | Andersen et al. | |
| 2008/0086982 A1 | 4/2008 | Parenteau et al. | |
| 2008/0099122 A1 | 5/2008 | Andersen et al. | |
| 2008/0145580 A1 | 6/2008 | McAllister et al. | |
| 2008/0286519 A1 | 11/2008 | Nicolson et al. | |
| 2009/0151602 A1 * | 6/2009 | Francis | 106/675 |
| 2010/0064943 A1 | 3/2010 | Guevara et al. | |
| 2010/0071597 A1 | 3/2010 | Perez-Pena | |
| 2010/0095622 A1 | 4/2010 | Niemoller | |
| 2010/0136269 A1 | 6/2010 | Andersen et al. | |
| 2011/0040401 A1 | 2/2011 | Daniels | |
| 2011/0120349 A1 | 5/2011 | Andersen et al. | |
| 2011/0131921 A1 * | 6/2011 | Chen | 52/784.1 |
| 2011/0167753 A1 | 7/2011 | Sawyers et al. | |
| 2012/0208003 A1 | 8/2012 | Beard | |
| 2012/0276310 A1 | 11/2012 | Andersen et al. | |
| 2013/0008115 A1 | 1/2013 | Bierman | |
| 2013/0086858 A1 | 4/2013 | Daniels et al. | |
| 2014/0000193 A1 | 1/2014 | Daniels et al. | |
| 2014/0000195 A1 | 1/2014 | Daniels et al. | |
| 2014/0000196 A1 | 1/2014 | Daniels et al. | |

FOREIGN PATENT DOCUMENTS

| | | |
|---|---|---|
| EP | 2230075 A1 | 9/2010 |
| JP | H05-052075 A | 3/1993 |
| JP | 2004332401 A | 11/2004 |
| WO | 02-31306 A1 | 4/2002 |
| WO | 2006138732 | 12/2006 |
| WO | 2007051093 | 5/2007 |
| WO | 2007053852 | 5/2007 |
| WO | WO2007053852 | 5/2007 |
| WO | 2008144186 | 11/2008 |
| WO | 2011066192 | 6/2011 |
| WO | 2012084716 A1 | 6/2012 |

OTHER PUBLICATIONS

International Search Report (KIPO) Search Report PCT/US12/059053 Mar. 12, 2013.

International Search Report (KIPO) PCT/US2013/048642 dated Sep. 2, 2013.

International Search Report (KIPO) PCT/US2013/048712 dated Sep. 10, 2013.

International Search Report [KIPO] PCT/US2014/035313 dated Aug. 19, 2014.

* cited by examiner

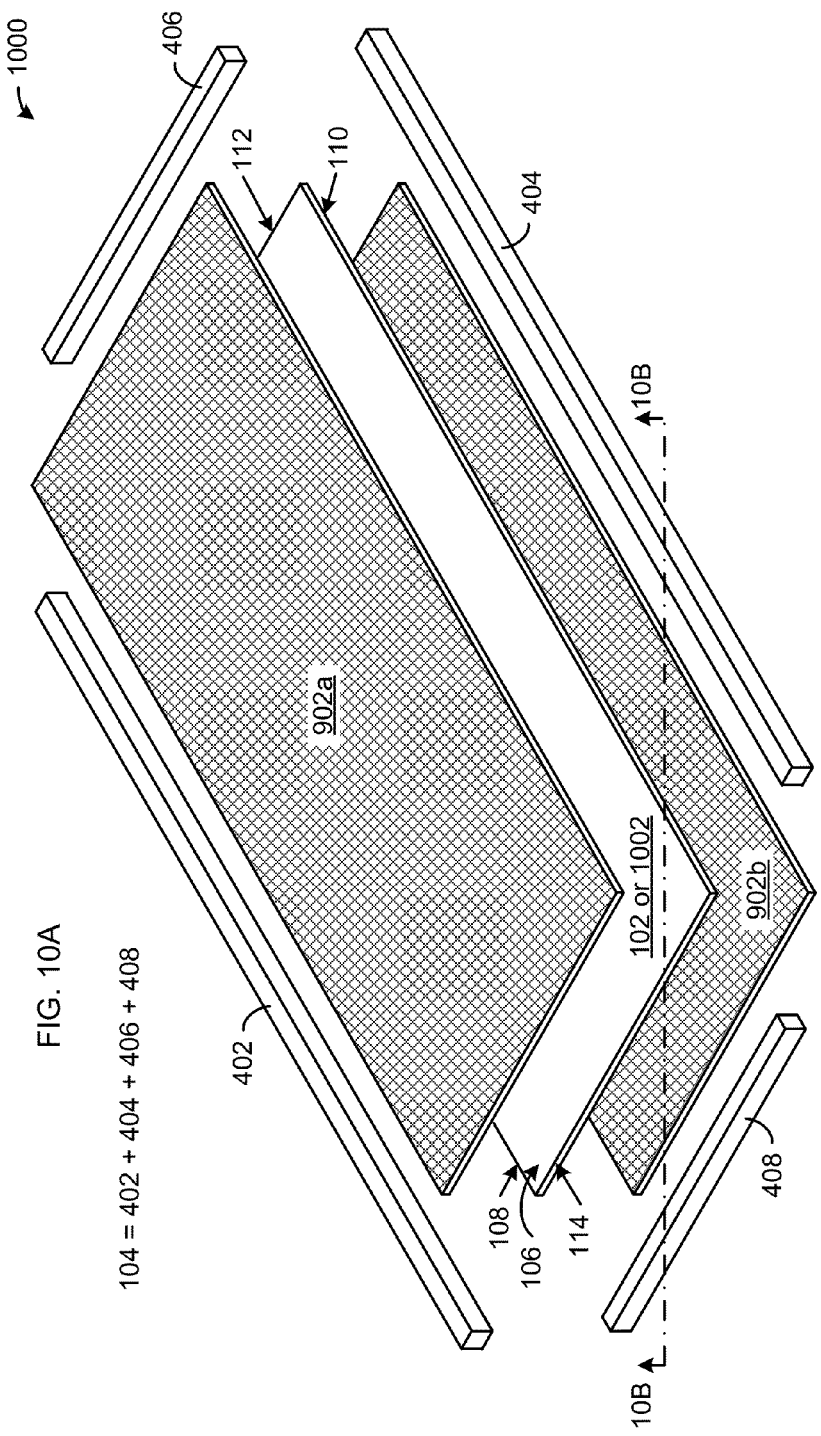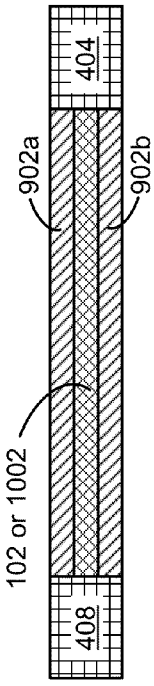

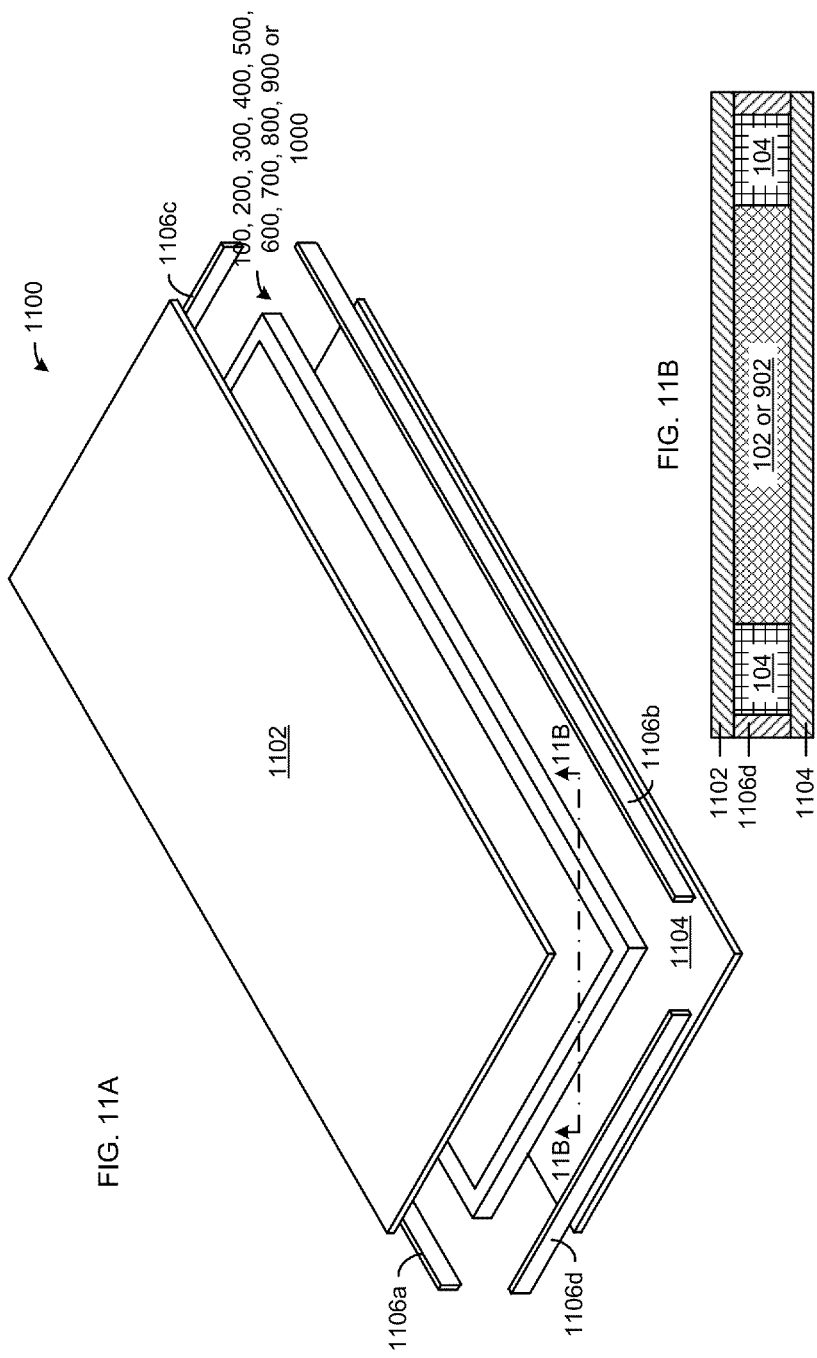

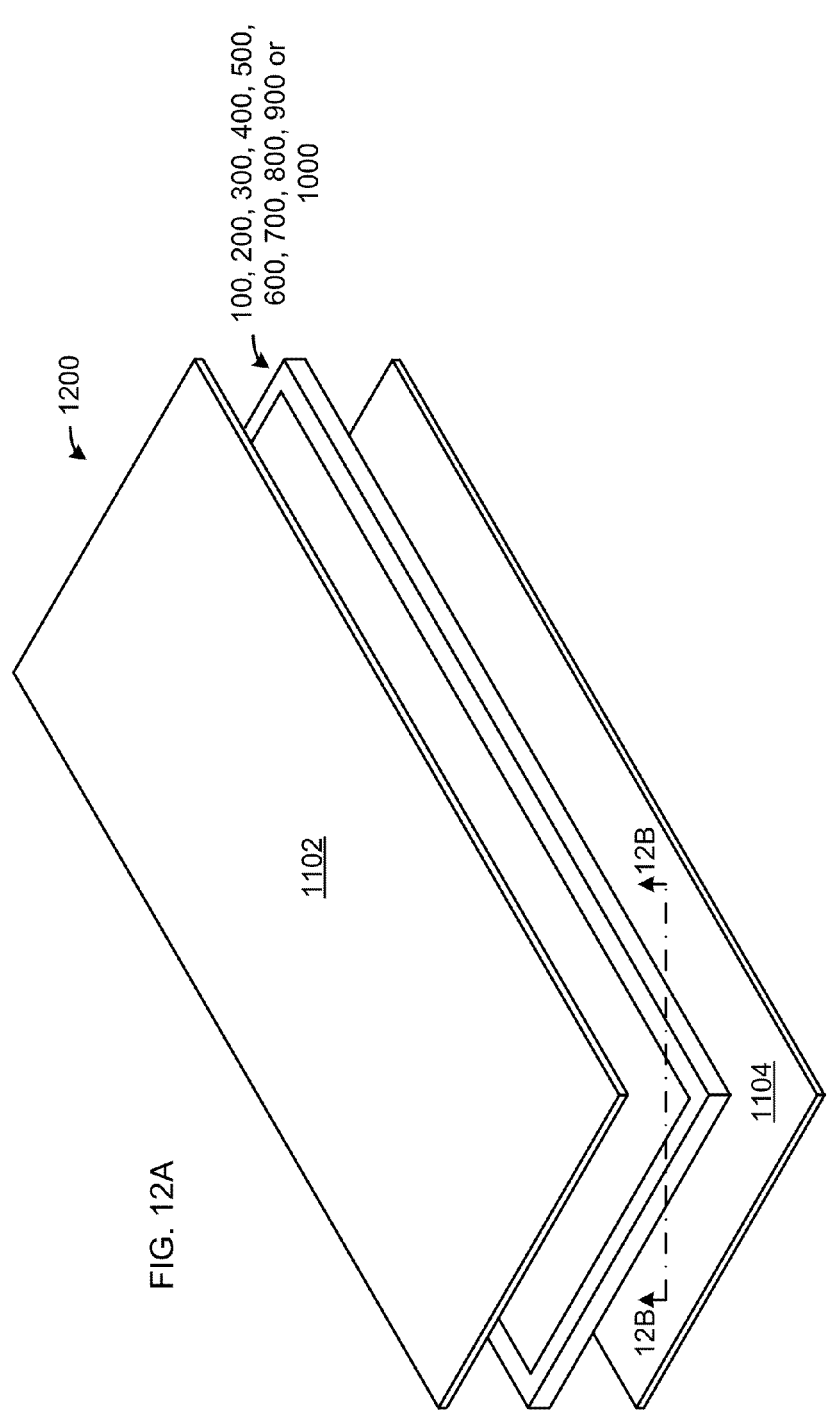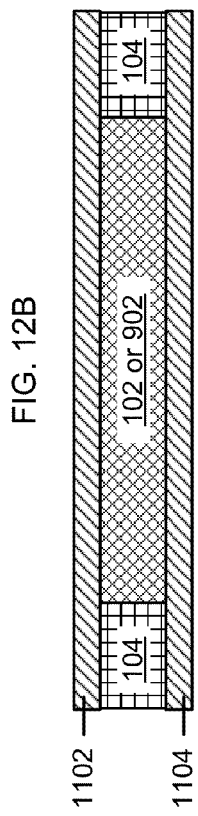

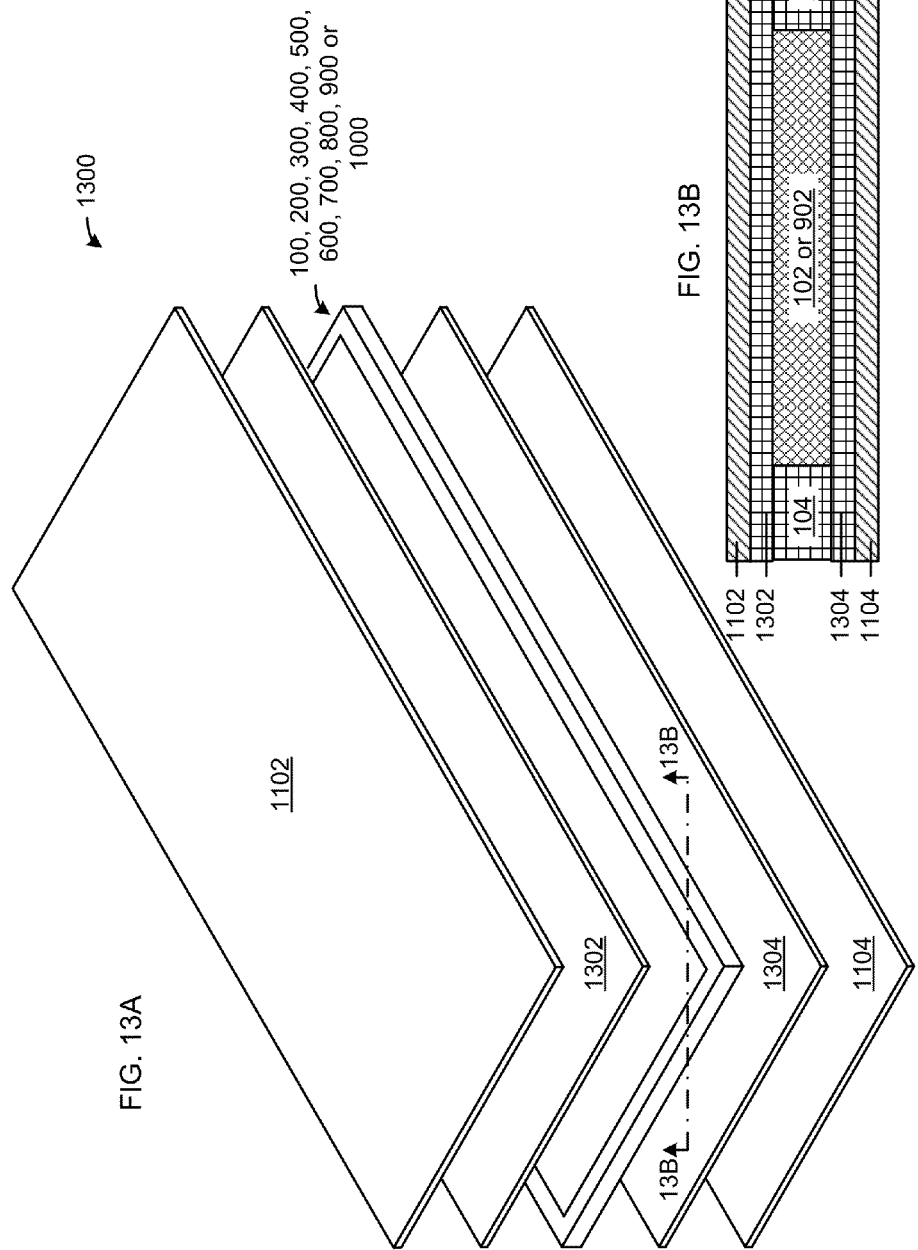

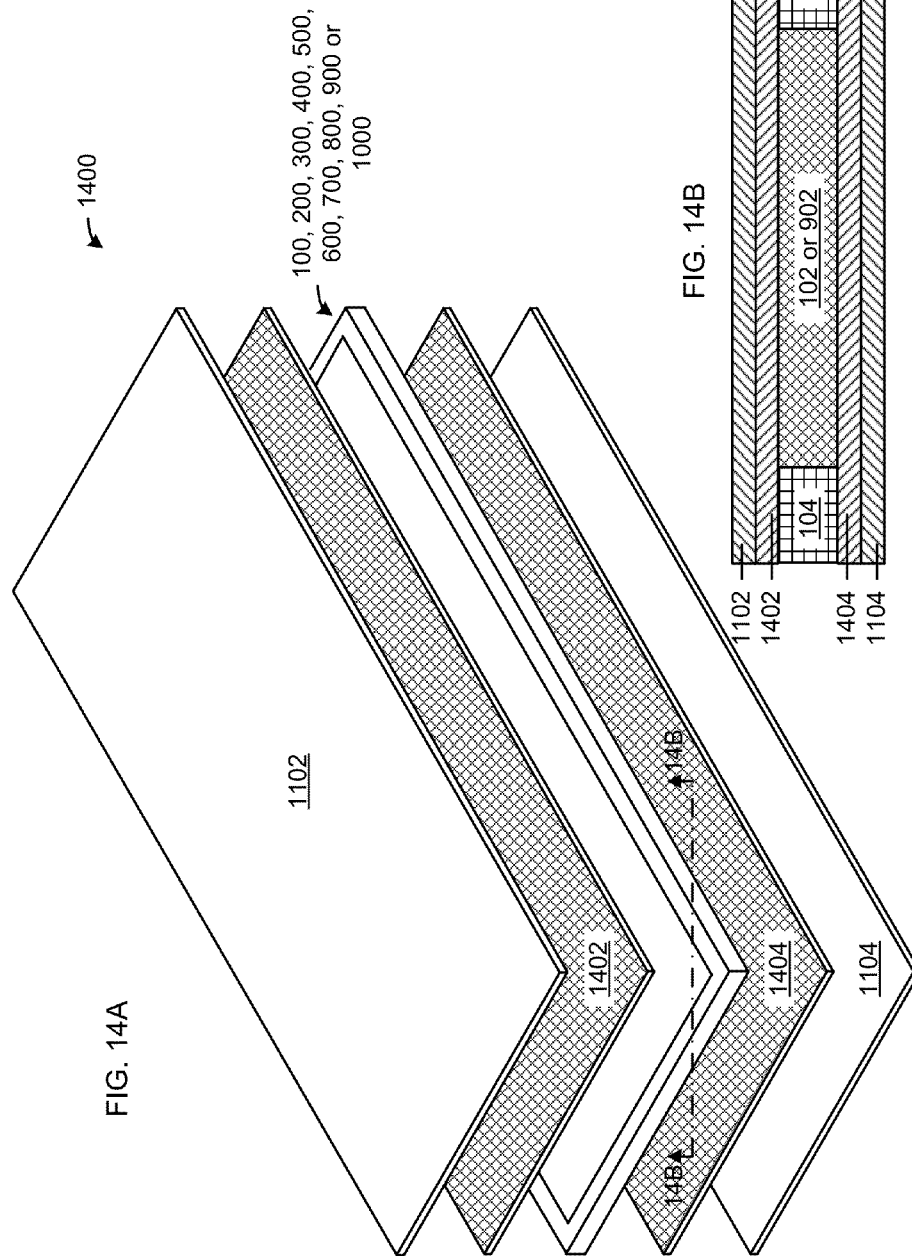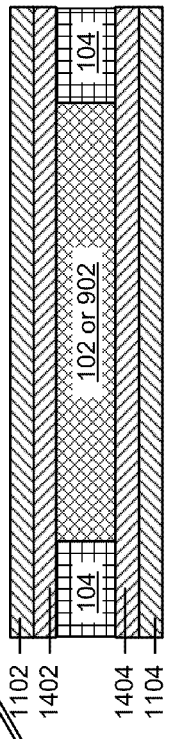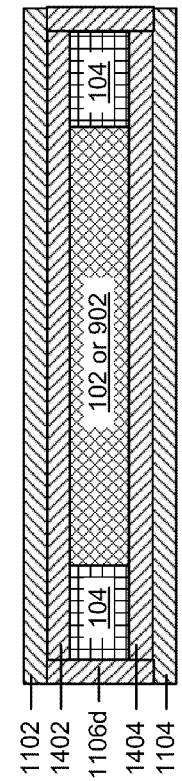

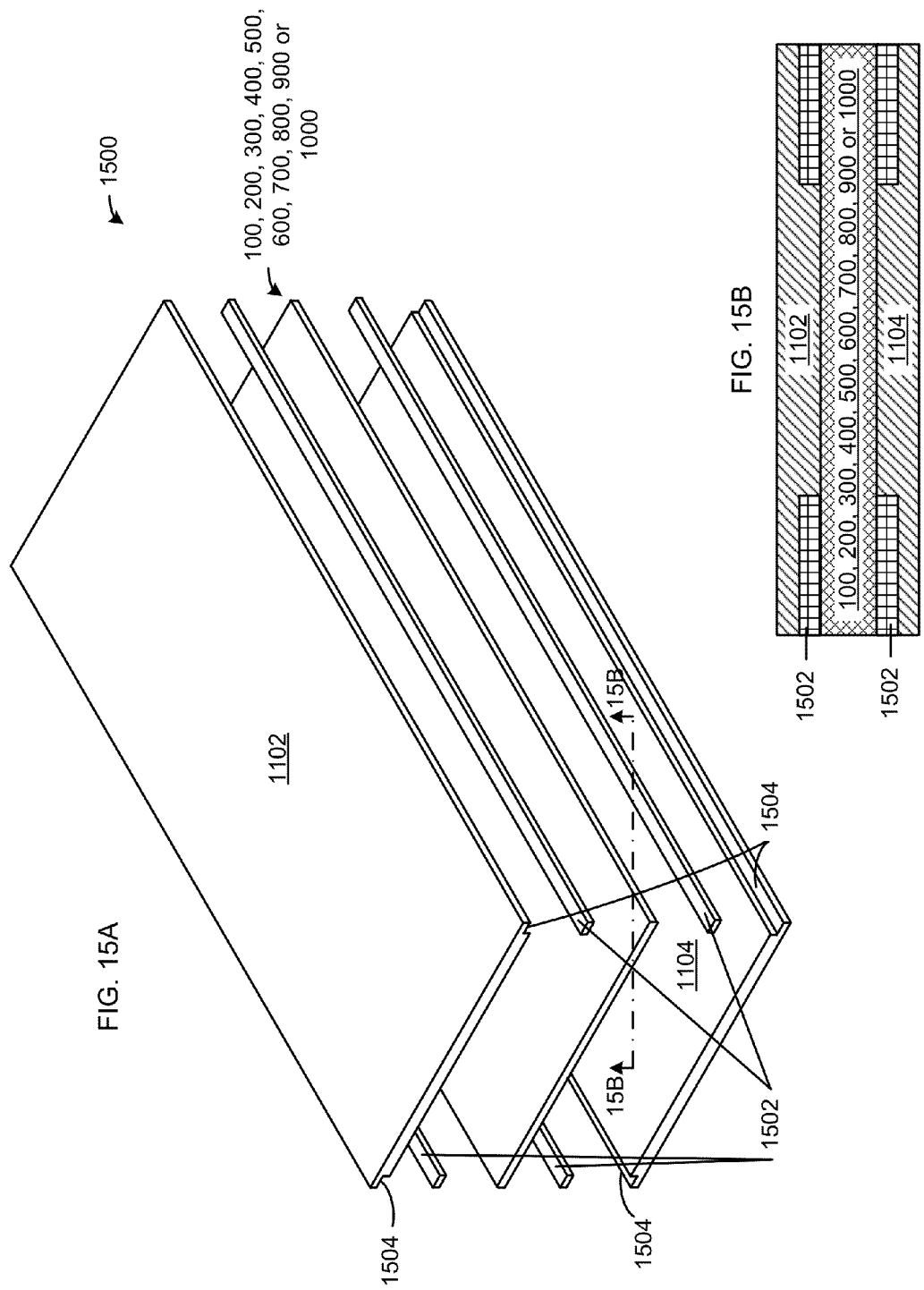

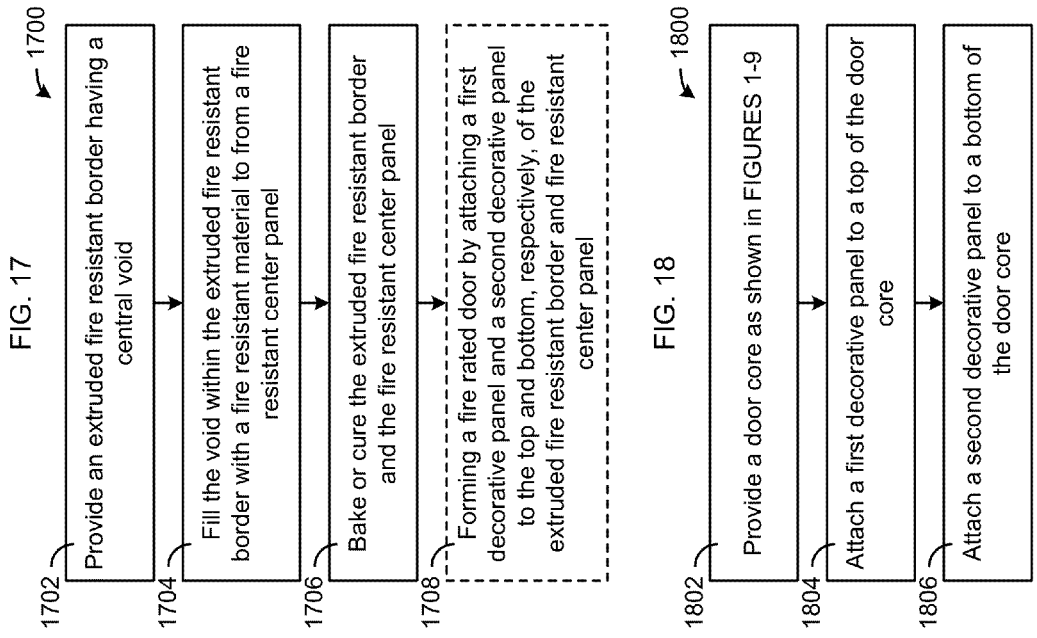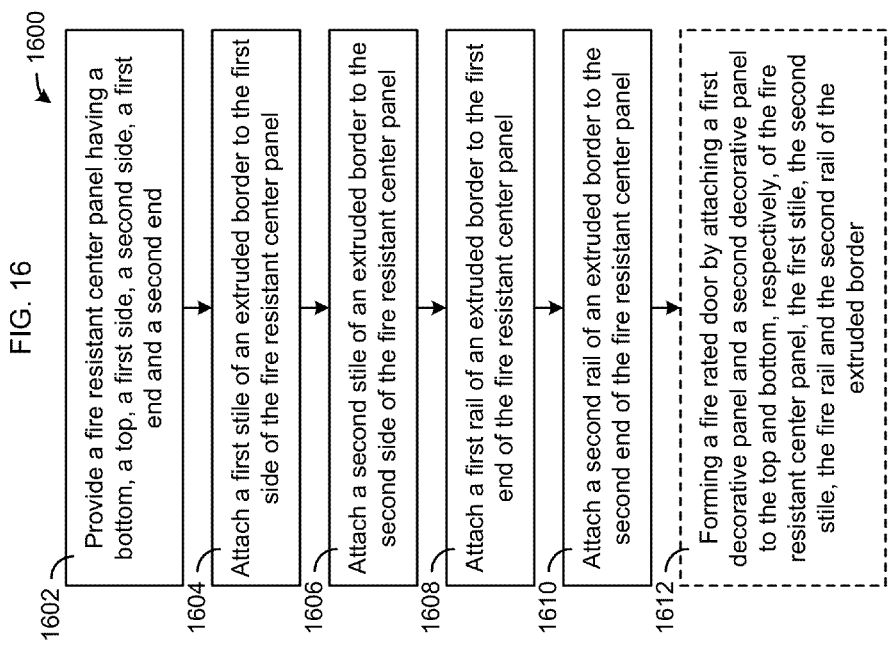

GYPSUM COMPOSITES USED IN FIRE RESISTANT BUILDING COMPONENTS

PRIORITY CLAIM AND CROSS-REFERENCE TO RELATED APPLICATIONS

This patent application is a divisional application of U.S. patent application Ser. No. 13/610,542 filed on Sep. 11, 2012 and entitled "Gypsum Composites Used in Fire Resistant Building Components", which is a continuation-in-part application of U.S. patent application Ser. No. 13/603,405 filed on Sep. 4, 2012 and entitled "Gypsum Composites Used in Fire Resistant Building Components", which is a continuation-in-part application of: (1) U.S. patent application Ser. No. 13/538,788 filed on Jun. 29, 2012 and entitled "Fire Rated Door Core"; and (2) U.S. patent application Ser. No. 13/538,828 filed on Jun. 29, 2012 and entitled "Fire Rated Door". All these applications are hereby incorporated by reference in their entirety.

FIELD OF THE INVENTION

The present invention relates generally to the field of composite materials and, more particularly, to gypsum composites used in fire resistant building materials.

BACKGROUND OF THE INVENTION

Many methods and techniques for manufacturing fire rated doors have been developed over time. But most of these prior art designs do not lend themselves well to fully automated manufacturing processes. Moreover, the prior art fire rated doors are expensive and require the internal mineral core. The internal core can be exposed in routed details and may reduce the strength of the door as a result of the reduced thickness of the door panels. In addition, alignment of the panels during assembly can be troublesome and require additional finishing to square the door after assembly.

Cement-based composites have been used in building materials for many years. For example, U.S. Pat. Nos. 5,549,859, 5,618,341, 5,631,097, 5,641,584, 5,658,624, 5,702,787, 5,766,525, 5,798,151, 5,849,155 and 6379446, and U.S. Published Patent Applications 2008/0099122, 2010/0136269 and 2011/0120349 describe various compositions and processes for making extruded cement-based composite products, all of which are hereby incorporated by reference in their entirety. These patents and published patent applications, however, do not disclose fire resistant composite components having the necessary fire resistant capabilities to produce doors, door cores and building panels that can receive fire rated certifications.

SUMMARY OF THE INVENTION

The present invention provides fire resistant composite components having the necessary fire resistant capabilities to produce doors, door cores and building panels that can receive fire rated certifications. In most cases, the length and width of the fire rated door core will match the length and width specifications of the final door product. The dimensions of the fire rated door core will typically be in widths of three feet and four feet and having a length ranging from seven feet to ten feet. The thickness of the fire core can range from 1.50 inches to 2.00 inches. In some cases, an exterior banding may be added to the sides and ends of the fire rated door core. In other cases, an intumescent banding may be added between the exterior banding and fire rated door core.

More specifically, the present invention provides a composite product including gypsum in an amount of 60 to 90% by weight, fibers in an amount of 1.5 to 26% by weight substantially homogeneously distributed through the composite, and a rheology-modifying agent in an amount of 0.5 to 6% by weight. The composite is caused or allowed to cure to form a cured composite. The cured composite is a fire resistant component used in a fire-rated door core, a fire-rated door or a fire-rated building panel. The fire resistant component may include a building panel, a door panel, a door core, a door rail, a door stile, a door lock block, a door border, or a door insert.

In addition, the present invention provides a composite product including gypsum in an amount of 60 to 85% by weight, fibers in an amount of 1.5 to 5% by weight substantially homogeneously distributed through the composite, an aggregate in an amount of 10 to 25% by weight substantially homogeneously distributed through the composite, a starch in an amount of 2 to 7% by weight and a rheology-modifying agent in an amount of 0.5 to 4% by weight. The composite is caused or allowed to cure to form a cured composite. The fire resistant component may include a building panel, a door panel, a door core, a door rail, a door stile, a door lock block, a door border, or a door insert used in a fire-rated door core, a fire-rated door or a fire-rated building panel.

The present invention also provides a composite product including gypsum in an amount of 70 to 90% by weight, glass fibers in an amount of 2 to 10% by weight substantially homogeneously distributed through the composite, cellulose fibers in an amount of 2 to 8% by weight substantially homogeneously distributed through the composite, polyvinyl alcohol fibers in an amount of 1 to 4% by weight substantially homogeneously distributed through the composite, polypropylene fibers in an amount of 0.3 to 4% by weight substantially homogeneously distributed through the composite, and a rheology-modifying agent in an amount of 0.5 to 6% by weight. The composite is caused or allowed to cure to form a cured composite. The fire resistant component may include a building panel, a door panel, a door core, a door rail, a door stile, a door lock block, a door border, or a door insert used in a fire-rated door core, a fire-rated door or a fire-rated building panel.

Moreover, the present invention provides a core for a fire rated door that includes a fire resistant center panel and an extruded fire resistant border. The fire resistant center panel has a bottom, a top, a first side, a second side, a first end and a second end. The fire resistant center panel is made of a first fire resistant material that includes gypsum in an amount of 60 to 85% by weight, fibers in an amount of 1.5 to 5% by weight substantially homogeneously distributed through the composite, an aggregate in an amount of 10 to 25% by weight substantially homogeneously distributed through the composite, a starch in an amount of 2 to 7% by weight and a rheology-modifying agent in an amount of 0.5 to 4% by weight. The extruded fire resistant border is attached to the first side, the second side, the first end and the second end of the fire resistant center panel. The extruded fire resistant border is made of a second fire resistant material that includes gypsum in an amount of 70 to 90% by weight, glass fibers in an amount of 2 to 10% by weight substantially homogeneously distributed through the composite, cellulose fibers in an amount of 2 to 8% by weight substantially homogeneously distributed through the composite, polyvinyl alcohol fibers in an amount of 1 to 4% by weight substantially homogeneously distributed through the composite, polypropylene fibers in an amount of 0.3 to 4% by weight substantially homogeneously distributed through the composite, and a rheology-modifying agent in an amount of 0.5 to 6% by weight.

The present invention also provides a fire rated door that includes a core, a first decorative panel and a second decorative panel. The core includes: (a) a fire resistant center panel having a bottom, a top, a first side, a second side, a first end and a second end, wherein the fire resistant center panel is made of a first fire resistant material that includes gypsum in an amount of 60 to 85% by weight, fibers in an amount of 1.5 to 5% by weight substantially homogeneously distributed through the composite, an aggregate in an amount of 10 to 25% by weight substantially homogeneously distributed through the composite, a starch in an amount of 2 to 7% by weight and a rheology-modifying agent in an amount of 0.5 to 4% by weight, and (b) an extruded fire resistant border attached to the first side, the second side, the first end and the second end of the fire resistant center panel, wherein the extruded fire resistant border is made of a second fire resistant material that includes gypsum in an amount of 70 to 90% by weight, glass fibers in an amount of 2 to 10% by weight substantially homogeneously distributed through the composite, cellulose fibers in an amount of 2 to 8% by weight substantially homogeneously distributed through the composite, polyvinyl alcohol fibers in an amount of 1 to 4% by weight substantially homogeneously distributed through the composite, polypropylene fibers in an amount of 0.3 to 4% by weight substantially homogeneously distributed through the composite, and a rheology-modifying agent in an amount of 0.5 to 6% by weight. The first decorative panel is attached to the top of the fire resistant center panel and the extruded fire resistant border. The second decorative panel is attached to the bottom of the fire resistant center panel and the extruded fire resistant border.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 10A is an exploded perspective view of door core for a fire rated door in accordance with another embodiment of the present invention;

FIG. 10B is a cross-sectional view of the door core of FIG. 10A;

FIG. 11A is an exploded perspective view of a fire rated door in accordance with one embodiment of the present invention;

FIG. 11B is a cross-sectional view of the fire rated door of FIG. 11A;

FIG. 11C is a cross-sectional view of an alternative version of the fire rated door of FIG. 11A;

FIG. 12A is an exploded perspective view of a fire rated door in accordance with another embodiment of the present invention;

FIG. 12B is a cross-sectional view of the fire rated door of FIG. 12A;

FIG. 13A is an exploded perspective view of a fire rated door in accordance with another embodiment of the present invention;

FIG. 13B is a cross-sectional view of the fire rated door of FIG. 13A;

FIG. 13C is a cross-sectional view of an alternative version of the fire rated door of FIG. 13A;

FIG. 14A is an exploded perspective view of a fire rated door in accordance with another embodiment of the present invention;

FIG. 14B is a cross-sectional view of the fire rated door of FIG. 14A;

FIG. 14C is a cross-sectional view of an alternative version of the fire rated door of FIG. 14A;

FIG. 15A is an exploded perspective view of a fire rated door in accordance with another embodiment of the present invention;

FIG. 15B is a cross-sectional view of the fire rated door of FIG. 15A;

FIG. 16 is a flow chart of a method of manufacturing a door core for a fire rated door in accordance with one embodiment of the present invention;

FIG. 17 is a flow chart of a method of manufacturing a door core for a fire rated door in accordance with another embodiment of the present invention; and FIG. 18 is a flow chart of a method of manufacturing a fire rated door in accordance with one embodiment of the present invention.

DETAILED DESCRIPTION OF THE INVENTION

Figure 1:
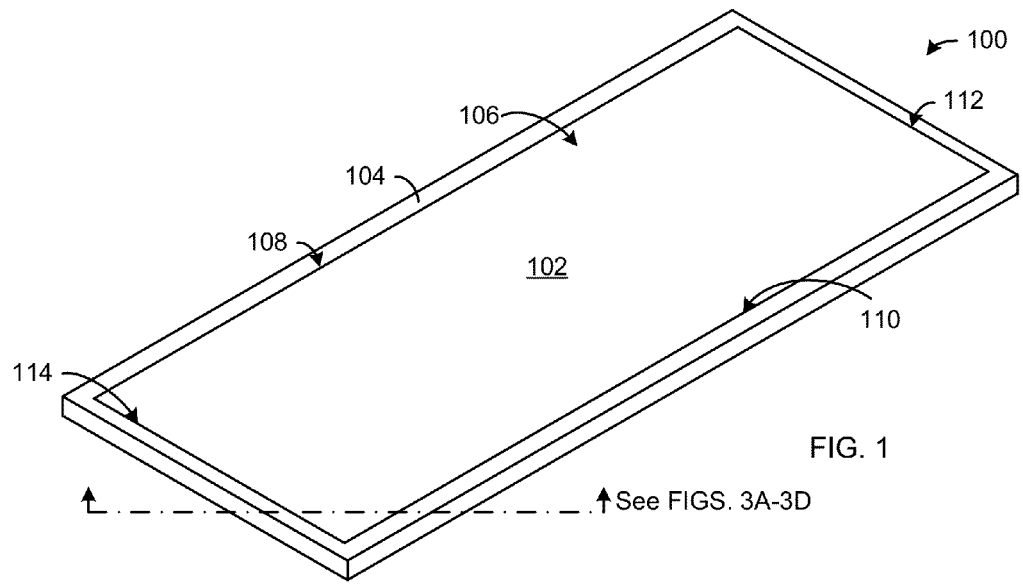
FIG. 1 is a perspective view of a door core for a fire rated door in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to fire rated doors, but it will be understood that the concepts of the present invention are applicable to any type of door.

The composite product of the present invention provides fire resistant components having the necessary fire resistant capabilities to produce doors, door cores and building panels that can receive fire rated certifications. The composite includes gypsum in an amount of 60 to 90% by weight, fibers in an amount of 1.5 to 26% by weight substantially homogeneously distributed through the composite, and a rheology-modifying agent in an amount of 0.5 to 6% by weight. The gypsum can be 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between. The fibers can be 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5% or 26% by weight or other incremental percentage between. The fibers can be glass fibers, cellulose fibers polyvinyl alcohol fibers, polypropylene fibers, or a combination thereof. Other types of fibers can be used. The rheology-modifying agent can be 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9% or 6% by weight or other incremental percentage between. The rheology-modifying agent can be hydroxypropoyl methyl celluose (HPMC), methyl hydroxyethyl cellulose (MHEC), hydroxyethyl cellulose (HEC) or carboxymethyl cellulose (CMC). Other types of rheology-modifying agent can be used.

The composite is caused or allowed to cure to form a cured composite. The actual component weights used will depend on the density desired for the fire resistant component. The cured composite is a fire resistant component used in a fire-rated door core, a fire-rated door or a fire-rated building panel. The fire resistant component may include a building panel, a door panel, a door core, a door rail, a door stile, a door lock block, a door border, or a door insert. The fire resistant component typically has a cross-sectional thickness of 0.125 inches to 2 inches, a width of 1 inch to 4 feet and a length of 3 to 10 feet. Moreover and unlike many prior art composite materials, the composite product in accordance with the present invention does not include any cement or flyash.

The door core of the present invention provides the fire resistant capabilities necessary to receive the necessary certification. The length and width of the fire core will match the length and width specifications of the final door product. The dimensions of the fire core will typically be in widths of three feet and four feet and having a length ranging from seven feet to ten feet. The thickness of the door core will typically be between 0.125" and 1.5". A door manufacturer can use any of the completed core designs described herein as the fire resistant core of the manufacturer's fire-rated door. The resulting fire rated door can have fire ratings of 20-30, 45, 60, 90 or 120 minutes depending on the configuration and materials used. The manufacturer will typically finish the final door product by adding a final piece of wood or veneer to the door to provide the aesthetic appeal of the product.

Now referring to FIG. 1, a perspective view of a door core 100 for a fire rated door in accordance with one embodiment of the present invention is shown. The core 100 includes a fire resistant center panel 102 and an extruded fire resistant border 104. The fire resistant center panel 102 has a bottom (not shown), a top 106, a first side 108, a second side 110, a first end 112 and a second end 114. The fire resistant center panel 102 is made of a first fire resistant material that is either pourable or extrudable. The first fire resistant material can be composed of gypsum, water, glass, a ceramic material, a cellulose or fiber material, and one or more binding agents. One example of such a material in accordance with the present invention is:

| First Fire Resistant Material | |
|---|---|
| Component | Range (% Wt.) |
| Gypsum | 60 to 85 |
| Glass Fiber | 1.5 to 5 |
| Lightweight Aggregate | 10 to 25 |
| Starch | 2 to 7 |
| Rheology-Modifying Agent | 0.5 to 4 |
| Vermiculite or Clay | 0 to 10 |

The gypsum can be 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% or 85% by weight or other incremental percentage between. The glass fibers can be 1.5%, 2%, 2.5%, 3%, 3.5%, 4%, 4.5% or 5% by weight or other incremental percentage between. The glass fibers can have a diameter of 6 mm to 25 mm. The lightweight aggregate can be 10%, 11%, 12%, 13%, 14%, 15%, 16%, 17%, 18%, 19%, 20%, 21%, 22%, 23%, 24% or 25% by weight or other incremental percentage between. The lightweight aggregate, such as Poraver® porous glass spheres, can have average particle diameters of 1 to 2 mm or 2 to 4 mm. The starch can be 2%, 2.5%, 3%, 3.5%, 4%, 4.5%, 5%, 5.5%, 6%, 6.5% or 7% by weight or other incremental percentage between. The starch is a pregelatinized or cook-up starch. The rheology-modifying agent can be cellulose ether, such as hydroxypropoyl methyl celluose (HPMC), methyl hydroxyethyl cellulose (MHEC), hydroxyethyl cellulose (HEC), carboxymethyl cellulose (CMC) or similar materials. The rheology-modifying agent can be 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9% or 4% by weight or other incremental percentage between. A vermiculite or clay can also be included in the composition in 0%, 1%, 2%, 3%, 4%, 5%, 6%, 7%, 8%, 9% or 10% by weight or other incremental percentage between. Other materials can be substituted as will be appreciated by those skilled in the art.

The extruded fire resistant border 104 is made of a second fire resistant material having a higher density than the first fire resistant material so that second fire resistant material has holding capacity (e.g., fasteners will adhere to the second fire resistant material and remain fixed once installed) and can be shaped using an extrusion process. One example of such a material in accordance with the present invention is:

| Second Fire Resistant Material | |
|---|---|
| Component | Range (% Wt.) |
| Gypsum | 70 to 90 |
| Glass Fiber | 2 to 10 |
| Cellulose Fiber | 2 to 8 |
| Polyvinyl Alcohol (PVA) Fiber | 1 to 4 |
| Polypropylene (PP) Fiber | 0.3 to 4 |
| Rheology-Modifying Agent | 0.5 to 6 |

The gypsum can be 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between. The glass fibers can be 2%, 2.5%, 3%, 3.5%, 4%, 4.5%, 5%, 5.5%, 6%, 6.5%, 7%, 7.5%, 8%, 8.5%, 9%, 9.5% or 10% by weight or other incremental percentage between. The glass fibers can have a diameter of 6 mm to 25 mm. The cellulose fibers can be 2%, 2.5%, 3%, 3.5%, 4%, 4.5%, 5%, 5.5%, 6%, 6.5%, 7%, 7.5% or 8% by weight or other incremental percentage between. The cellulose fibers can be hardwood or softwood fiber.

The polyvinyl alcohol (PVA) fibers can be 1%, 1.5%, 2%, 2.5%, 3%, 3.5% or 4% by weight or other incremental percentage between. The PVA fibers can have a diameter of 6 mm to 10 mm with a decitex of approximately 15. The polypropylene (PP) fibers can be 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9% or 4% by weight or other incremental percentage between. The PP fibers can have a diameter of 6 mm to 25 mm. The rheology-modifying agent can be 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9% or 6% by weight or other incremental percentage between. The rheology-modifying agent can be a cellulose ether, such as hydroxypropoyl methyl cellulose (HPMC), methyl hydroxyethyl cellulose (MHEC), hydroxyethyl cellulose (HEC), carboxymethyl cellulose (CMC) or similar materials. Other materials can be substituted as will be appreciated by those skilled in the art.

Figure 3A:
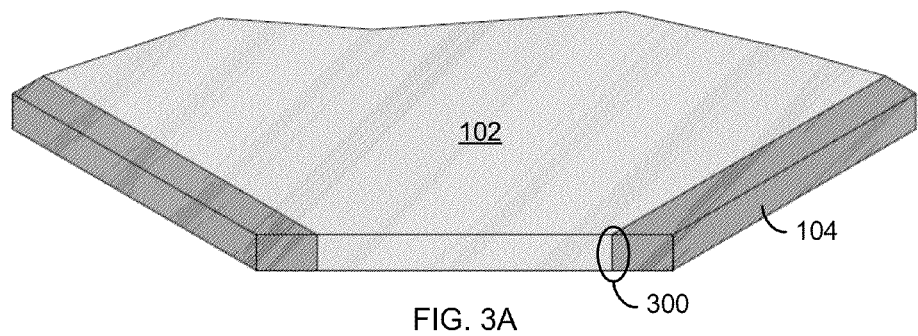
FIGS. 3A-3D are cross-sectional views of various interfaces of the center panel and the border of a door core in accordance with one embodiment of the present invention.
Figure 3B:
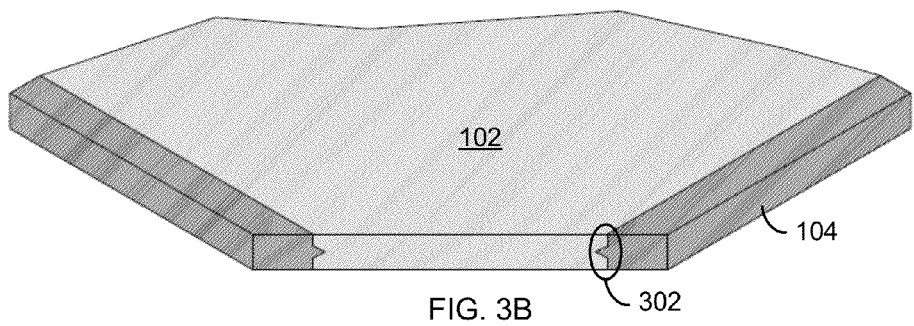
Figure 3C:
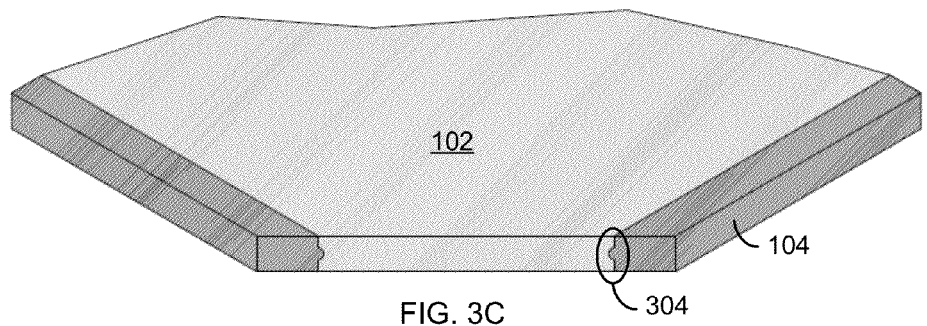
Figure 3D:
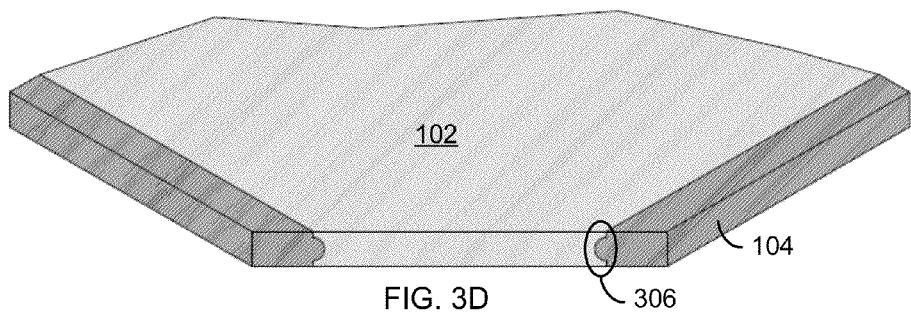
Figure 4:
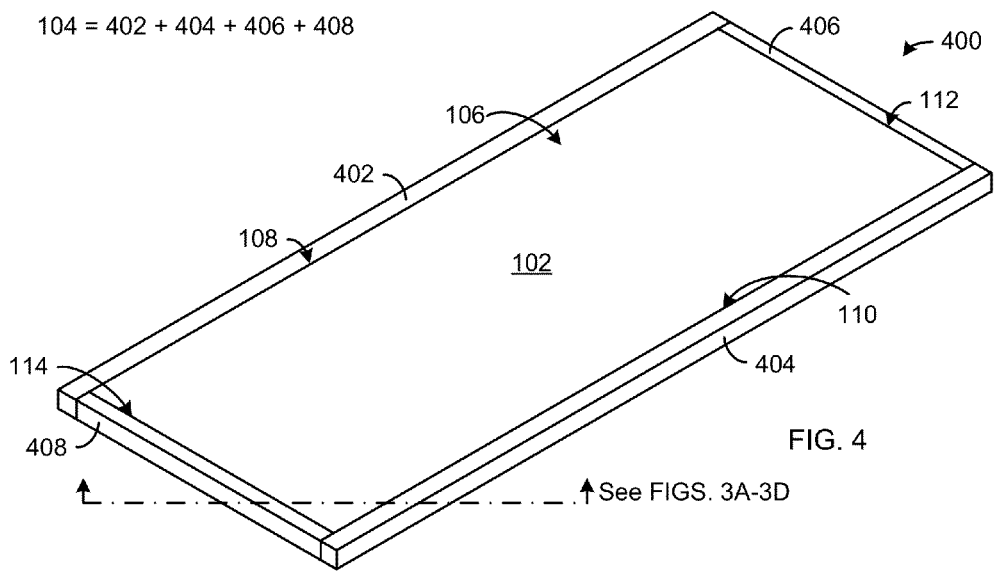
FIG. 4 is a perspective view of a door core for a fire rated door in accordance with another embodiment of the present invention.

The extruded fire resistant border 104 can be made of a molded piece of the second fire resistant material (e.g., FIG. 1), or stiles and rails made of the second fire resistant material that are glued or fastened together (e.g., FIG. 4). The extruded fire resistant border 104 is attached to the first side 108, the second side 110, the first end 112 and the second end 114 of the fire resistant center panel 102 using glue, fasteners or a bonding process (e.g., pouring the first fire resistant material into a "mold" formed by the extruded fire resistant border 104). Several examples of the interface between the extruded fire resistant border 104 and the fire resistant center panel 102 are shown in FIGS. 3A-3D.

The physical dimensions of the core 100 and other cores described below in reference to FIGS. 2-10A and B, the fire resistant center panel 102 and the extruded fire resistant border 104 will vary depending on the specific application for which the door core is manufactured. Typical dimensions may include, but are not limited to, 1.5" to 2.0" thickness of the fire resistant panel 102 and the extruded fire resistant border 104, a 7' to 10' overall length of the core 100, a 3' to 4' overall width of the core 100, a 1" to 5" width of the top and bottom portions (rails) of the extruded fire resistant border 104, and a 1" to 5" (e.g., 1.625") width of the left and right portion (stiles) of the extruded fire resistant border 104.

The core 100 and other cores described below in reference to FIGS. 2-10A and B can be manufactured by assembling the fire resistant border 104, pouring the first fire resistant material in the area formed by the fire resistant border 104, and baking the core 100. Alternatively, the core 100 can be manufactured by creating sheets of the first fire resistant material and the second fire resistant material using an extrusion process, gang ripping the sheets of the second fire resistant material to make the fire resistant border stiles and rails, finishing the extruded stiles and rails to profile or cut them to the desired smoothness, size and shape, and gluing or fastening the fire resistant border stiles and rails to the fire resistant center panel 102.

Figure 2:
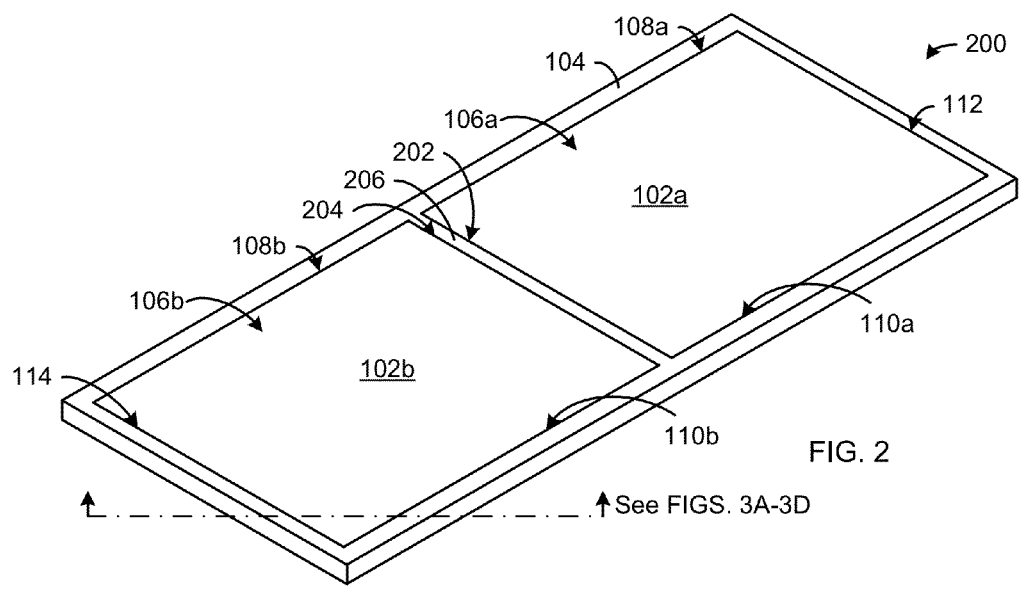
FIG. 2 is a perspective view of a door core for a fire rated door in accordance with another embodiment of the present invention.

Referring now to FIG. 2, a perspective view of a door core 200 for a fire rated door in accordance with another embodiment of the present invention is shown. The core 200 includes a first fire resistant center panel 102a, a second fire resistant center panel 102b and an extruded fire resistant border 104. The first fire resistant center panel 102a has a bottom (not shown), a top 106a, a first side 108a, a second side 110a, a first end 112 and a second end 202. The second fire resistant center panel 102b has a bottom (not shown), a top 106b, a first side 108b, a second side 110b, a first end 204 and a second end 114. The first fire resistant center panel 102a and second fire resistant center panel 102b are made of the first fire resistant material that is either pourable or extrudable. The extruded fire resistant border 104 is made of the second fire resistant material having a higher density than the first fire resistant material so that second fire resistant material has holding capacity (e.g., fasteners will adhere to the second fire resistant material and remain fixed once installed) and can be shaped using an extrusion process. The extruded fire resistant border 104 also includes a center rail 206 made of the second fire resistant material. The extruded fire resistant border 104 can be made of a molded piece of the second fire resistant material (e.g., FIG. 2), or stiles and rails made of the second fire resistant material that are glued or fastened together (e.g., FIG. 5). The extruded fire resistant border 104 (including center rail 206) is attached to the first side 108a, the second side 110a, the first end 112a and the second end 202 of the fire resistant center panel 102a and the first side 108b, the second side 110b, the first end 204 and the second end 114 of the second fire resistant center panel 102b using glue, fasteners or a bonding process (e.g., pouring the first fire resistant material into a "mold" formed by the extruded fire resistant border 104). Several examples of the interface between the extruded fire resistant border 104 and the fire resistant center panels 102a, 102b are shown in FIGS. 3A-3D.

The physical dimensions of the core 200 and other cores described below in reference to FIGS. 3-10A and B, the fire resistant center panels 102a, 102b and the extruded fire resistant border 104 will vary depending on the specific application for which the door core is manufactured. Typical dimensions may include, but are not limited to, 1.5" thickness of the fire resistant panels 102a, 102b and the extruded fire resistant border 104, a 7' to 10' overall length of the core 100, a 3' to 4' overall width of the core 100, a 1" to 5" width of the top, bottom and center portions (rails) of the extruded fire resistant border 104, and a 1" to 5" (e.g., 1.625") width of the left and right portion (stiles) of the extruded fire resistant border 104.

Now referring to FIGS. 3A-3D, cross-sectional views of various interfaces of the center panel 102 and the border 104 of a door core 100, 200, 400, 500, 600, 700, 800 and 900 in accordance with one embodiment of the present invention is shown. FIG. 3A shows a straight interface wherein a glue is used to attach the extruded fire resistant border 104 to the fire resistant center panel 102. Note that the straight interface can be angled with respect to the top of the fire resistant center panel 102 instead of being substantially perpendicular. As shown in FIGS. 3B-3D, the extruded fire resistant border 104 can be attached to the fire resistant center panel 102 with a set of male-female connectors 300 formed in the extruded fire resistant border 104 and the fire resistant center panel 102. The male-female connectors can be triangular-shaped 300a (FIG. 3B), curved-shaped 300b (FIG. 3C) or 300c (FIG. 3D), rectangular-shaped, angled, tongue-and-groove, or a combination thereof. A glue is typically used is used to attach the extruded fire resistant border 104 to the fire resistant center panel 102, but fasteners or a bonding process can also be used.

Referring now to FIG. 4, a perspective view of a door core 400 for a fire rated door in accordance with another embodiment of the present invention is shown. The core 400 includes a fire resistant center panel 102 and an extruded fire resistant border 104. The fire resistant center panel 102 has a bottom (not shown), a top 106, a first side 108, a second side 110, a first end 112 and a second end 114. The fire resistant center panel 102 is made of the first fire resistant material that is either pourable or extrudable. The extruded fire resistant border 104 is made up of a first stile 402 (left), a second stile 404 (right), a first rail 406 (top) and a second rail 408 (bottom). The first stile 402 (left), second stile 404 (right), first rail 406 (top) and second rail 408 (bottom) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (top) and second rail 408 (bottom) are glued or fastened together and to the fire resistant center panel 102. The first stile 402 (left) is attached to the first side 108 of the fire resistant center panel 102 using glue, fasteners or a bonding process. The second stile 404 (right) is attached to the second side 110 of the fire resistant center panel 102 using glue, fasteners or a bonding process. The first rail 406 (top) is attached to the first end 112 of the fire resistant center panel 102 using glue, fasteners or a bonding process. The second rail 408 (top) is attached to the second end 114 of the fire resistant center panel 102 using glue, fasteners or a bonding process. Several examples of the interface between the stiles 402, 404, the rails 406, 408, and the fire resistant center panel 102 are shown in FIGS. 3A-3D.

Figure 5:
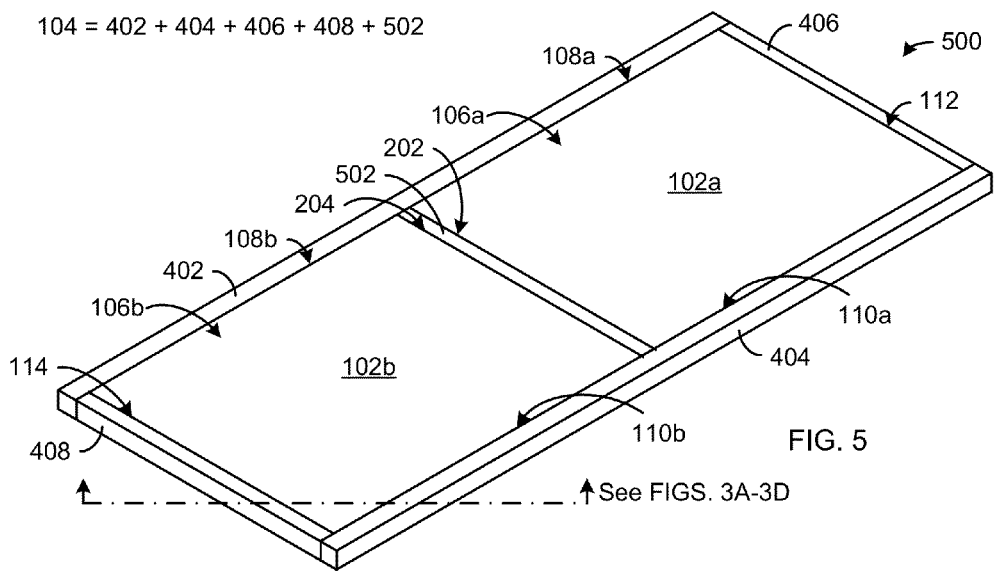
FIG. 5 is a perspective view of a door core for a fire rated door in accordance with another embodiment of the present invention.

Now referring to FIG. 5, a perspective view of a door core 500 for a fire rated door in accordance with another embodiment of the present invention is shown. The core 500 includes a first fire resistant center panel 102a, a second fire resistant panel 102b and an extruded fire resistant border 104. The first fire resistant center panel 102a has a bottom (not shown), a top 106a, a first side 108a, a second side 110a, a first end 112a and a second end 202. The second fire resistant center panel 102b has a bottom (not shown), a top 106b, a first side 108b, a second side 110b, a first end 204 and a second end 114. The first fire resistant center panel 102a and second fire resistant center panel 102b are made of the first fire resistant material that is either pourable or extrudable. The extruded fire resistant border 104 is made up of a first stile 402 (left), a second stile 404 (right), a first rail 406 (top), a second rail 408 (bottom) and a third rail or insert 502 (center). The first stile 402 (left), second stile 404 (right), first rail 406 (top), second rail 408 (bottom) and third rail or insert 502 (center) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (top), second rail 408 (bottom), third rail or insert 502 (center) are glued or fastened together and to the fire resistant center panels 102a and 102b. The first stile 402 (left) is attached to the first side 108a, 108b of the fire resistant center panels 102a, 102b using glue, fasteners or a bonding process. The second stile 404 (right) is attached to the second side 110a, 110b of the fire resistant center panels 102a, 102b using glue, fasteners or a bonding process. The first rail 406 (top) is attached to the first end 112 of the first fire resistant center panel 102a using glue, fasteners or a bonding process. The second rail 408 (bottom) is attached to the second end 114 of the second fire resistant center panel 102b using glue, fasteners or a bonding process. The third rail or insert 502 (center) is attached to the second end 202 of the first fire resistant center panel 102a and the first end 204 of the second fire resistant panel 102b using glue, fasteners or a bonding process. Several examples of the interface between the stiles 402, 404, the rails 406, 408, and the fire resistant center panels 102a, 102b are shown in FIGS. 3A-3D. These interfaces can also be used between the fire resistant center panels 102a, 102b and the third rail or insert 502 (center).

Figure 6:
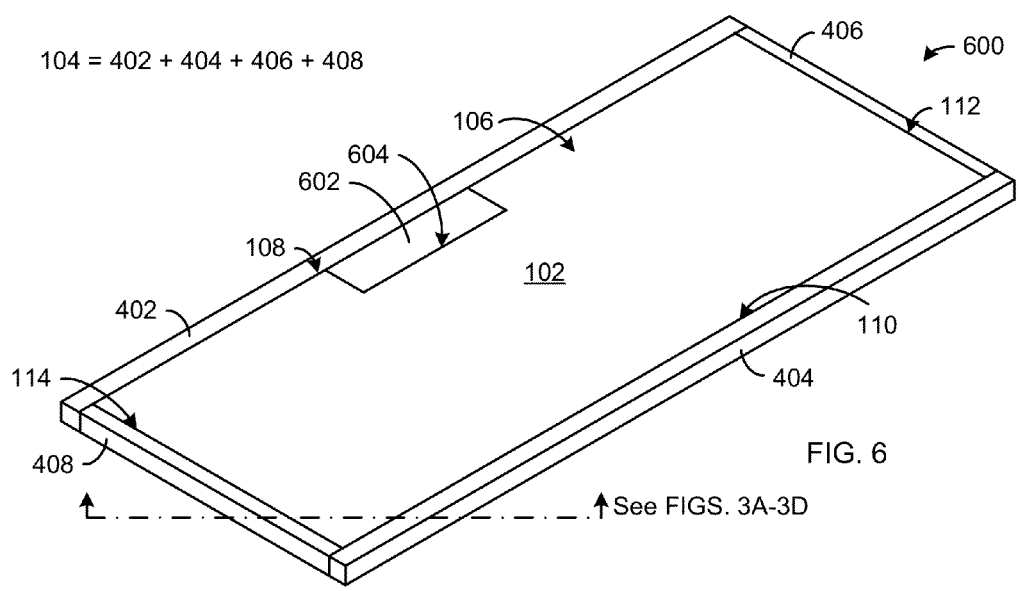
FIG. 6 is a perspective view of a door core for a fire rated door in accordance with another embodiment of the present invention.

Referring now to FIG. 6, a perspective view of a door core 600 for a fire rated door in accordance with another embodiment of the present invention is shown. The core 600 includes a fire resistant center panel 102, an extruded fire resistant border 104 and a lock block 602. The fire resistant center panel 102 has a bottom (not shown), a top 106, a first side 108, a second side 110, a first end 112, a second end 114 and a cutout or notch 604 disposed in the first side 108. The fire resistant center panel 102 is made of the first fire resistant material that is either pourable or extrudable. The lock block 602 is disposed within the cutout or notch 604 of the fire resistant center panel 102. The lock block 602 is made of the second fire resistant material and is sized to accommodate a door handle, lockset or other door hardware. The extruded fire resistant border 104 is made up of a first stile 402 (left), a second stile 404 (right), a first rail 406 (top) and a second rail 408 (bottom). The first stile 402 (left), second stile 404 (right), first rail 406 (top) and second rail 408 (bottom) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (top) and second rail 408 (bottom) are glued or fastened together and to the fire resistant center panel 102 and lock block 602. The first stile 402 (left) is attached to the first side 108 of the fire resistant center panel 102 and the lock block 602 using glue, fasteners or a bonding process. The second stile 404 (right) is attached to the second side 110 of the fire resistant center panel 102 using glue, fasteners or a bonding process. The first rail 406 (top) is attached to the first end 112 of the fire resistant center panel 102 using glue, fasteners or a bonding process. The second rail 408 (top) is attached to the second end 114 of the fire resistant center panel 102 using glue, fasteners or a bonding process. Several examples of the interface between the stiles 402, 404, the rails 406, 408, and the fire resistant center panel 102 are shown in FIGS. 3A-3D. These interfaces can also be used between the lock block 602, the fire resistant center panel 102 and the first stile 402 (left).

Figure 7:
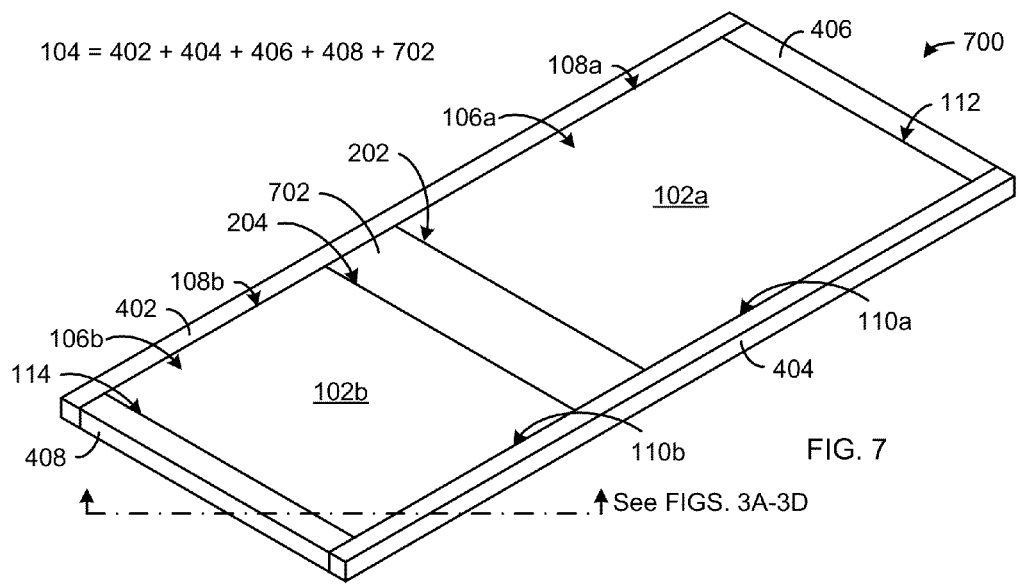
FIG. 7 is a perspective view of a door core for a fire rated door in accordance with another embodiment of the present invention.

Now referring to FIG. 7, a perspective view of a door core 700 for a fire rated door in accordance with another embodiment of the present invention is shown. The core 700 includes a first fire resistant center panel 102a, a second fire resistant panel 102b and an extruded fire resistant border 104. The first fire resistant center panel 102a has a bottom (not shown), a top 106a, a first side 108a, a second side 110a, a first end 112a and a second end 202. The second fire resistant center panel 102b has a bottom (not shown), a top 106b, a first side 108b, a second side 110b, a first end 204 and a second end 114. The first fire resistant center panel 102a and second fire resistant center panel 102b are made of the first fire resistant material that is either pourable or extrudable. The extruded fire resistant border 104 is made up of a first stile 402 (left), a second stile 404 (right), a first rail 406 (top), a second rail 408 (bottom) and a third rail or insert 702 (middle). The first stile 402 (left), second stile 404 (right), first rail 406 (top), second rail 408 (bottom) and third rail or insert 702 (middle) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (*top*), second rail 408 (bottom), third rail or insert 702 (middle) are glued or fastened together and to the fire resistant center panels 102*a* and 102*b*. The first stile 402 (left) is attached to the first side 108*a*, 108*b* of the fire resistant center panels 102*a*, 102*b* using glue, fasteners or a bonding process. The second stile 404 (right) is attached to the second side 110*a*, 110*b* of the fire resistant center panels 102*a*, 102*b* using glue, fasteners or a bonding process. The first rail 406 (*top*) is attached to the first end 112 of the first fire resistant center panel 102*a* using glue, fasteners or a bonding process. The second rail 408 (bottom) is attached to the second end 114 of the second fire resistant center panel 102*b* using glue, fasteners or a bonding process. The third rail or insert 702 (middle) is attached to the second end 202 of the first fire resistant center panel 102*a* and the first end 204 of the second fire resistant panel 102*b* using glue, fasteners or a bonding process. The third rail or insert 702 (middle) is positioned and sized (e.g., 5" to 10" wide) to accept various attachments, such as a crash bar. Several examples of the interface between the stiles 402, 404, the rails 406, 408, and the fire resistant center panels 102*a*, 102*b* are shown in FIGS. 3A-3D. These interfaces can also be used between the fire resistant center panels 102*a*, 102*b* and the third rail or insert 702 (middle).

Figure 8:
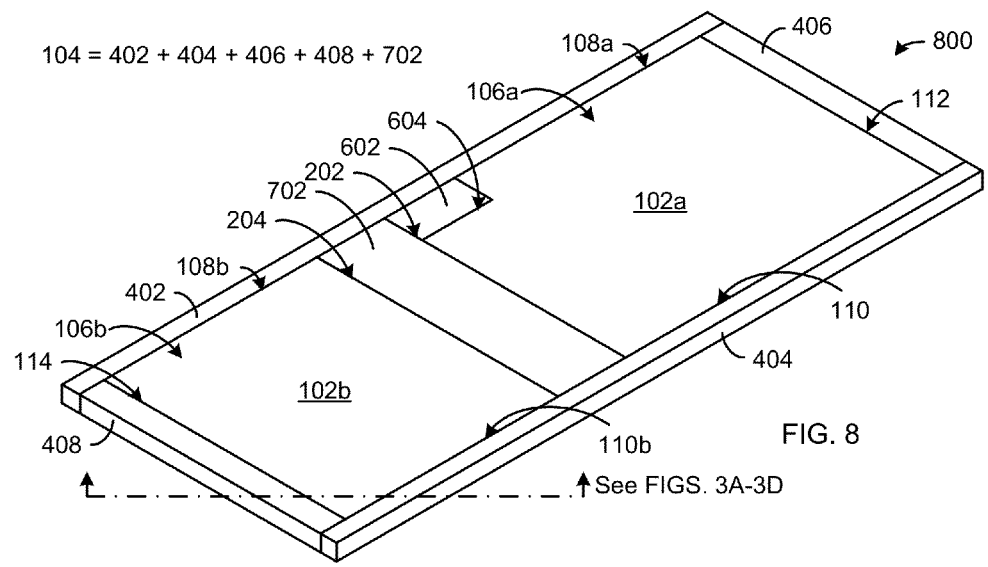
FIG. 8 is a perspective view of a door core for a fire rated door in accordance with another embodiment of the present invention.

Referring now to FIG. 8, a perspective view of a door core 800 for a fire rated door in accordance with another embodiment of the present invention is shown. The core 800 includes a first fire resistant center panel 102*a*, a second fire resistant center panel 102*b*, an extruded fire resistant border 104 and a lock block 602. The first fire resistant center panel 102*a* has a bottom (not shown), a top 106*a*, a first side 108*a*, a second side 110*a*, a first end 112*a*, a second end 202 and a cutout or notch 604 disposed in the first side 108*a*. The second fire resistant center panel 102*b* has a bottom (not shown), a top 106*b*, a first side 108*b*, a second side 110*b*, a first end 204 and a second end 114. The first fire resistant center panel 102*a* and second fire resistant center panel 102*b* are made of the first fire resistant material that is either pourable or extrudable. The lock block 602 is disposed within the cutout or notch 604 of the first fire resistant center panel 102*a*. The lock block 602 is made of the second fire resistant material and is sized to accommodate a door handle, lockset or other door hardware. The extruded fire resistant border 104 is made up of a first stile 402 (left), a second stile 404 (right), a first rail 406 (*top*), a second rail 408 (bottom) and a third rail or insert 702 (middle). The first stile 402 (left), second stile 404 (right), first rail 406 (top), second rail 408 (bottom) and third rail or insert 702 (middle) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (*top*), second rail 408 (bottom), third rail or insert 702 (middle) are glued or fastened together and to the fire resistant center panels 102*a*, 102*b* and lock block 602. The first stile 402 (left) is attached to the first side 108*a*, 108*b* of the fire resistant center panels 102*a*, 102*b* and the lock block 602 using glue, fasteners or a bonding process. The second stile 404 (right) is attached to the second side 110*a*, 110*b* of the fire resistant center panels 102*a*, 102*b* using glue, fasteners or a bonding process. The first rail 406 (*top*) is attached to the first end 112 of the first fire resistant center panel 102*a* using glue, fasteners or a bonding process. The second rail 408 (bottom) is attached to the second end 114 of the second fire resistant center panel 102*b* using glue, fasteners or a bonding process. The third rail or insert 702 (middle) is attached to the second end 202 of the first fire resistant center panel 102*a*, the first end 204 of the second fire resistant panel 102*b* and the lock block 602 using glue, fasteners or a bonding process. The third rail or insert 702 (middle) is positioned and sized (e.g., 5" to 10" wide) to accept various attachments, such as a crash bar. Several examples of the interface between the stiles 402, 404, the rails 406, 408, and the fire resistant center panels 102*a*, 102*b* are shown in FIGS. 3A-3D. These interfaces can also be used between the lock block 602, the fire resistant center panel 102*a*, the first stile 402 (left) and the third rail or insert 702 (middle).

Figure 9:
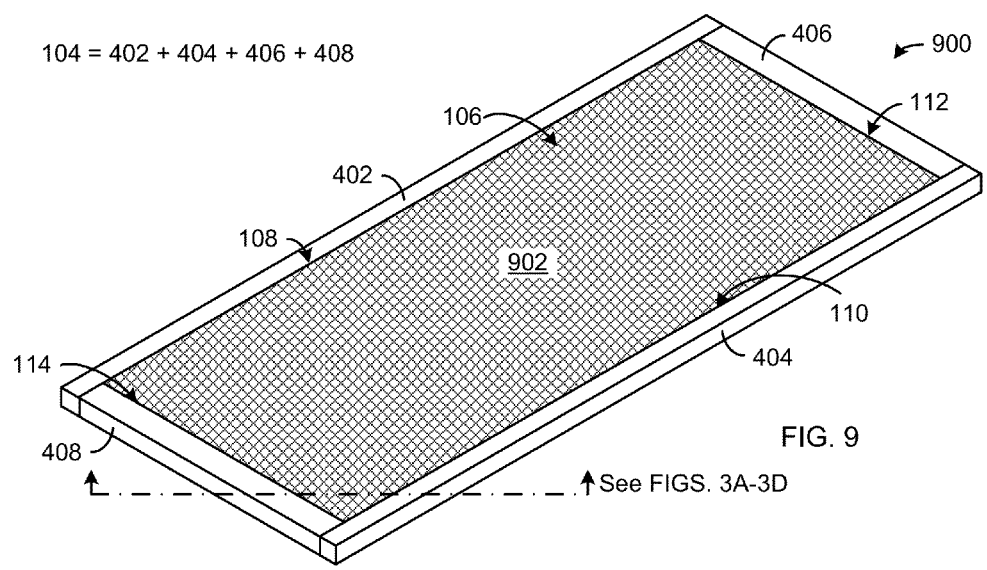
FIG. 9 is a perspective view of a door core for a fire rated door in accordance with another embodiment of the present invention.

Now referring to FIG. 9, a perspective view of a door core 900 for a fire rated door in accordance with another embodiment of the present invention is shown. The core 900 includes a center panel 902 and an extruded fire resistant border 104. The center panel 902 has a bottom (not shown), a top 106, a first side 108, a second side 110, a first end 112 and a second end 114. The center panel 902 is made of a corrugated filler (e.g., cardboard, etc.) having a plurality of voids (e.g., honeycomb shaped, hexagon shaped, triangular shaped, etc.) and may be filled with an acoustical insulating material (e.g., fiberglass, foam, etc.). The extruded fire resistant border 104 is made up of a first stile 402 (left), a second stile 404 (right), a first rail 406 (*top*) and a second rail 408 (bottom). The first stile 402 (left), second stile 404 (right), first rail 406 (*top*) and second rail 408 (bottom) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (*top*) and second rail 408 (bottom) are glued or fastened together and to the center panel 902. The first stile 402 (left) is attached to the first side 108 of the center panel 902 using glue, fasteners or a bonding process. The second stile 404 (right) is attached to the second side 110 of the center panel 902 using glue, fasteners or a bonding process. The first rail 406 (*top*) is attached to the first end 112 of the center panel 902 using glue, fasteners or a bonding process. The second rail 408 (*top*) is attached to the second end 114 of the center panel 902 using glue, fasteners or a bonding process. Several examples of the interface between the stiles 402, 404, the rails 406, 408, and the fire resistant center panel 902 are shown in FIGS. 3A-3D. Note that the center panel 902 is not suitable for forming a fire resistant door alone. Fire resistant materials or panels must be installed on the top 106 and bottom (not shown) of the center panel 902 in order to make a fire resistant door. For example, the center panel 902 can be used in the doors 1100 (FIG. 11A), 1200 (FIG. 12A) and 1300 (FIG. 13A) if panels 1102, 1102 and 1302, respectively, are made of a fire resistant material (e.g., the second fire resistant material, etc.).

Referring now to FIG. 10A, an exploded perspective view of door core 1000 for a fire rated door in accordance with another embodiment of the present invention is shown. The core 1000 includes a fire resistant center panel 102 or 1002 disposed between a top insulating panel 902*a* and a bottom insulating panel 902*b*, and an extruded fire resistant border 104 around the three panels 902*a*, 102 (or 1002) and 902*b*. The fire resistant center panel 102 is made of the first fire resistant material that is either pourable or extrudable. The fire resistant center panel 1002 is made of the second fire resistant material that is either pourable or extrudable. The top insulating panel 902a and bottom insulating panel 902b are made of a corrugated filler (e.g., cardboard, etc.) having a plurality of voids (e.g., honeycomb shaped, hexagon shaped, triangular shaped, etc.) and may be filled with an acoustical insulating material (e.g., fiberglass, foam, etc.). The three panels 902a, 102 (or 1002) and 902b are typically glued together. The fire resistant center panel 102 or 1002 has a bottom (not shown), a top 106, a first side 108, a second side 110, a first end 112 and a second end 114. The extruded fire resistant border 104 is made up of a first stile 402 (left), a second stile 404 (right), a first rail 406 (top) and a second rail 408 (bottom). The first stile 402 (left), second stile 404 (right), first rail 406 (top) and second rail 408 (bottom) are made of the second fire resistant material having a higher density than the first fire resistant material so that second fire resistant material has holding capacity (e.g., fasteners will adhere to the second fire resistant material and remain fixed once installed) and can be shaped using an extrusion process. The first stile 402 (left), second stile 404 (right), first rail 406 (top) and second rail 408 (bottom) are glued or fastened together and to the three panels 902a, 102 (or 1002) and 902b. The first stile 402 (left) is attached to the first side 108 of the three panels 902a, 102 (or 1002) and 902b using glue, fasteners or a bonding process. The second stile 404 (right) is attached to the second side 110 of the three panels 902a, 102 (or 1002) and 902b using glue, fasteners or a bonding process. The first rail 406 (top) is attached to the first end 112 of the three panels 902a, 102 (or 1002) and 902b using glue, fasteners or a bonding process. The second rail 408 (top) is attached to the second end 114 of the three panels 902a, 102 (or 1002) and 902b using glue, fasteners or a bonding process. Several examples of the interface between the stiles 402, 404, the rails 406, 408, and the fire resistant center panel 102 are shown in FIGS. 3A-3D. FIG. 10B is a cross-sectional view of the door core of FIG. 10A.

Note that the cores shown in FIGS. 1-10A and B, and described above may also include a top panel attached to the top of the core 100, 200, 300, 400, 500, 600, 700, 800, 900 or 1000, or a bottom panel attached to the bottom of the core 100, 200, 300, 400, 500, 600, 700, 800, 900 or 1000, or both the top panel and the bottom panel attached to the core 100, 200, 300, 400, 500, 600, 700, 800, 900 or 1000. Example of such a configuration is shown in FIGS. 13A and 14A. The top panel or the bottom panel can be a lignocellulosic substrate, a wood, a wood composite, a medium density fiberboard, a high density fiberboard, a particleboard, a masonite, a fiberglass, a metal, a plastic, a fire resistant panel, one or more protective layers or a combination thereof. The one or more protective layers can be a fire resistant material, a blast resistant material, a ballistic resistant material, a shielding material, a chemical resistant material, a biohazard resistant material, a radiation resistant material, a dampening material, a grounding material, insulating material or a combination thereof. For example, the one or more protective layers can be one or more gypsum boards, one or more metallic sheets, one or more lead sheets, one or more Kevlar sheets, one or more ceramic sheets, a layer of urethane foam, a layer of graphite, a wire mesh or a combination thereof. Moreover, the core 100, 200, 300, 400, 500, 600, 700, 800, 900 or 1000 and/or top or bottom panels can be coated with an intumescent or fire resistant material. Finally, note that the rails shown in the figures can extend to the sides of the door or core such that the stiles extend between the top and bottom rails.

Referring now to FIG. 11A, an exploded perspective view of a fire rated door 1100 in accordance with one embodiment of the present invention is shown. The fire rated door 1100 includes a core 100, 200, 300, 400, 500, 600, 700, 800, 900 or 1000 (see FIGS. 1-10A and B and associated description for details), a first decorative panel 1102 and a second decorative panel 1104. The first and second decorative panel 1102 and 1104 can be a lignocellulosic substrate, a wood, a wood composite, a medium density fiberboard, a high density fiberboard, a particleboard, a masonite, a fiberglass, a metal, a plastic, a fire resistant material or a combination thereof. The first decorative panel 1102 is attached to the top of the core 100, 200, 300, 400, 500, 600, 700, 800, 900 or 1000 using glue. The second decorative panel 1104 is attached to the bottom of the core 100, 200, 300, 400, 500, 600, 700, 800, 900 or 1000 using glue. Note that the glue may have fire resistant properties or contain an intumescent material. The first and second decorative panels 1102 and 1104 have a slightly larger length and width to accommodate an exterior banding 1106 attached to each side and end of the core 100, 200, 300, 400, 500, 600, 700, 800, 900 or 1000. The exterior banding 1106 can be a first banding 1106a, a second banding 1106b, a third banding 1106c and a fourth banding 1106d. FIG. 11B shows a cross-sectional view of the fire rated door 1100. FIG. 11C shows a cross-sectional view of an alternative version of the fire rated door 1100 in which an intumescent banding material 1108 can also be disposed between the exterior banding 1106 and the core 100, 200, 300, 400, 500, 600, 700, 800, 900 or 1000.

Now referring to FIG. 12A, an exploded perspective view of a fire rated door 1200 in accordance with another embodiment of the present invention is shown. The fire rated door 1200 includes a core 100, 200, 300, 400, 500, 600, 700, 800, 900 or 1000 (see FIGS. 1-10A and B and associated description for details), a first decorative panel 1102 and a second decorative panel 1104. The first and second decorative panel 1102 and 1104 can be a lignocellulosic substrate, a wood, a wood composite, a medium density fiberboard, a high density fiberboard, a particleboard, a masonite, a fiberglass, a metal, a plastic, a fire resistant material or a combination thereof. Note that the first and second decorative panels 1102 and 1104 may also have fire resistant properties. The first decorative panel 1102 is attached to the top of the core 100, 200, 300, 400, 500, 600, 700, 800, 900 or 1000 using glue. The second decorative panel 1104 is attached to the bottom of the core 100, 200, 300, 400, 500, 600, 700, 800, 900 or 1000 using glue. Note that the glue may have fire resistant properties or contain an intumescent material. The first and second decorative panels 1102 and 1104 have the same length and width as the core 100, 200, 300, 400, 500, 600, 700, 800, 900 or 1000. As a result, additional banding, rails and stiles are not needed. FIG. 12B shows a cross-sectional view of the fire rated door 1200.

Referring now to FIG. 13A, an exploded perspective view of a fire rated door 1300 in accordance with another embodiment of the present invention is shown. The fire rated door 1300 includes a core 100, 200, 300, 400, 500, 600, 700, 800, 900 or 1000 (see FIGS. 1-10A and B and associated description for details), a first protective panel or layer 1302 (also referred to as a top panel), a first decorative panel 1102, a second protective panel or layer 1304 (also referred to as a bottom panel) and a second decorative panel 1104. The first protective panel or layer 1302 and the second protective panel or layer 1304 can be a fire resistant material, a blast resistant material, a ballistic resistant material, a shielding material, a chemical resistant material, a biohazard resistant material, a radiation resistant material, a dampening material, a grounding material, insulating material or a combination thereof. For example, the first protective panel or layer 1302 and the second protective panel or layer 1304 can be one or more gypsum boards, one or more metallic sheets, one or more lead sheets, one or more Kevlar sheets, one or more ceramic sheets, a layer of urethane foam, a layer of graphite, a wire mesh or a combination thereof. A 120 minute fire rated door can be obtained by using a dense fire resistant material, such as second fire resistant material, as the first and second protective panels or layers 1302 and 1304. The first and second decorative panel 1102 and 1104 can be a lignocellulosic substrate, a wood, a wood composite, a medium density fiberboard, a high density fiberboard, a particleboard, a masonite, a fiberglass, a metal, a plastic, a fire resistant material or a combination thereof. The first decorative panel 1102 is attached to the top of the first protective panel or layer 1302 using glue. The first protective panel or layer 1302 is attached to the top of the core 100, 200, 300, 400, 500, 600, 700, 800, 900 or 1000 using glue. The second decorative panel 1104 is attached to the bottom of the second protective panel or layer 1304 using glue. The second protective panel or layer 1304 is attached to the bottom of the core 100, 200, 300, 400, 500, 600, 700, 800, 900 or 1000 using glue. Note that the glue may have fire resistant properties or contain an intumescent material. The first and second decorative panels 1102, 1104 and first and second protective panels or layers 1302, 1304 have the same length and width as the core 100, 200, 300, 400, 500, 600, 700, 800, 900 or 1000. As a result, additional banding, rails and stiles are not needed. FIG. 13B shows a cross-sectional view of the fire rated door 1300. FIG. 13C shows a cross-sectional view of an alternative version of the fire rated door 1300 in which the first and second decorative panels 1102 and 1104 have a slightly larger length and width to accommodate an exterior banding 1106 attached to each side and end of the core 100, 200, 300, 400, 500, 600, 700, 800, 900 or 1000. As shown in FIG. 11A, the exterior banding 1106 can be a first banding 1106a, a second banding 1106b, a third banding 1106c and a fourth banding 1106d. In addition, an alternative version of the fire rated door 1300 can be fabricated in which an intumescent banding material 1108 is disposed between the exterior banding 1106 and the core 100, 200, 300, 400, 500, 600, 700, 800, 900 or 1000 (see FIG. 11C).

Now referring to FIG. 14A, an exploded perspective view of a fire rated door 1400 in accordance with another embodiment of the present invention is shown. The fire rated door 1400 includes a core 100, 200, 300, 400, 500, 600, 700, 800, 900 or 1000 (see FIGS. 1-10A and B and associated description for details), a first insulating panel or layer 1402, a first decorative panel 1102, a second insulating panel or layer 1404 and a second decorative panel 1104. The first insulating panel or layer 1402 and the second protective panel or layer 1404 is made of a corrugated filler (e.g., cardboard, etc.) having a plurality of voids (e.g., honeycomb shaped, hexagon shaped, triangular shaped, etc.) filled with an insulating and/or fire resistant material (e.g., fiberglass, foam, etc.). The first and second decorative panel 1102 and 1104 can be a lignocellulosic substrate, a wood, a wood composite, a medium density fiberboard, a high density fiberboard, a particleboard, a masonite, a fiberglass, a metal, a plastic, a fire resistant material or a combination thereof. The first decorative panel 1102 is attached to the top of the first insulating panel or layer 1402 using glue. The first insulating panel or layer 1402 is attached to the top of the core 100, 200, 300, 400, 500, 600, 700, 800, 900 or 1000 using glue. The second decorative panel 1104 is attached to the bottom of the second insulating panel or layer 1404 using glue. The second insulating panel or layer 1404 is attached to the bottom of the core 100, 200, 300, 400, 500, 600, 700, 800, 900 or 1000 using glue. Note that the glue may have fire resistant properties or contain an intumescent material. The first and second decorative panels 1102, 1104 and first and second insulating panels or layers 1402, 1404 have the same length and width as the core 100, 200, 300, 400, 500, 600, 700, 800, 900 or 1000. As a result, additional banding, rails and stiles are not needed. FIG. 14B shows a cross-sectional view of the fire rated door 1400. FIG. 14C shows a cross-sectional view of an alternative version of the fire rated door 1400 in which the first and second decorative panels 1102 and 1104 have a slightly larger length and width to accommodate an exterior banding 1106 attached to each side and end of the core 100, 200, 300, 400, 500, 600, 700, 800, 900 or 1000. As shown in FIG. 11A, the exterior banding 1106 can be a first banding 1106a, a second banding 1106b, a third banding 1106c and a fourth banding 1106d. In addition, an alternative version of the fire rated door 1400 can be fabricated in which an intumescent banding material 1108 is disposed between the exterior banding 1106 and the core 100, 200, 300, 400, 500, 600, 700, 800, 900 or 1000 (see FIG. 11C).

Referring now to FIG. 15A, an exploded perspective view of a fire rated door 1500 in accordance with another embodiment of the present invention is shown. The fire rated door 1500 includes a core 100, 200, 300, 400, 500, 600, 700, 800, 900 or 1000 (see FIGS. 1-10 and associated description for details), a first decorative panel 1102, a second decorative panel 1104 and four rails 1502. Alternatively, the core 100, 200, 300, 400, 500, 600, 700, 800, 900 or 1000 can be a single sheet of fire resistant material, including, but not limited to the first fire resistant material. The back side of first and second decorative panel 1102 and 1104 include a notch or cutout 1504 along the left and right sides that is sized to fit each rail 1502. Each rail 1502 is made of the second fire resistant material or other suitable material. In one example, the rails have a height of $^{11}\!/_{16}"$ and width of 1". The first and second decorative panel 1102 and 1104 can be a lignocellulosic substrate, a wood, a wood composite, a medium density fiberboard, a high density fiberboard, a particleboard, a masonite, a fiberglass, a metal, a plastic, a fire resistant material or a combination thereof. Note that the first and second decorative panels 1102 and 1104 may also have fire resistant properties. The first decorative panel 1102 is attached to the top of the core 100, 200, 300, 400, 500, 600, 700, 800, 900 or 1000 or single sheet of fire resistant material using glue. The second decorative panel 1104 is attached to the bottom of the core 100, 200, 300, 400, 500, 600, 700, 800, 900 or 1000 or single sheet of fire resistant material using glue. Note that the glue may have fire resistant properties or contain an intumescent material. The first and second decorative panels 1102 and 1104 have the same length and width as the core 100, 200, 300, 400, 500, 600, 700, 800, 900 or 1000 or single sheet of fire resistant material. As a result, additional banding, rails and stiles are not needed. FIG. 15B shows a cross-sectional view of the fire rated door 1400.

Now referring to FIG. 16, a flow chart of a method 1600 of manufacturing a door core for a fire rated door in accordance with one embodiment of the present invention is shown. A fire resistant center panel having a bottom, a top, a first side, a second side, a first end and a second end is provided in block 1602, wherein the fire resistant center panel is made of a first fire resistant material. A first stile of an extruded fire resistant border is attached to the first side of the fire resistant center panel in block 1604, wherein the extruded fire resistant border is made of a second fire resistant material having a higher density than the first fire resistant material. A second stile of the extruded fire resistant border is attached to the second side of the fire resistant center panel in block 1606. A first rail of the extruded fire resistant border is attached to the first end of the fire resistant center panel and the first stile and the second stile of the extruded fire resistant border in block 1608. A second rail of the extruded fire resistant border is attached to the second end of the fire resistant center panel and the first stile and the second stile of the extruded fire resistant border in block 1610. An optional step may include forming a fire rated door by attaching a first decorative and a second decorative panel to the top and bottom, respectively, of the fire resistant center panel, the first stile, the second stile, the first rail and the second rail of the extruded border in block 1612. Additional elements can be added as described in reference to FIGS. 11-15A and B. Another optional step may include coating the fire resistant center panel and the extruded fire resistant border with an intumescent or fire resistant material. Note that the method 1600 can be performed as part of a continuous manufacturing process.

In one embodiment, a notch is formed in the first side of the fire resistant center panel, a fire resistant lock block is inserted within the notch and the fire resistant lock block is attached to the fire resistant center panel and the extruded fire resistant border, wherein the fire resistant lock block is made of the second fire resistant material. In another embodiment, the fire resistant center panel includes: (a) a first fire resistant center panel disposed between the first side and the second side proximate to the first end, wherein the first fire resistant center panel is made of the first fire resistant material; (b) a second fire resistant center panel disposed between the first side and the second side proximate to the second end, wherein the second fire resistant center panel is made of the first fire resistant material; and (c) a fire resistant insert disposed between and attached to the first fire resistant center panel and the second fire resistant center panel, and extending between and attached to the extruded fire resistant border at the first side and the second side, wherein the fire resistant material is made of the second fire resistant material. In yet another embodiment, a set of male-female connectors are formed in the extruded fire resistant border and the fire resistant center panel. The male-female connectors can be triangular-shaped, curved-shaped, rectangular-shaped, angled, tongue-and-groove, or a combination thereof.

In another embodiment, the first fire resistant material is extruded or molded to form the fire resistant center panel, and the second fire resistant material is extruded or molded to form the first stile, the second stile, the first rail and the second rail of the extruded fire resistant border. In yet another embodiment, the first fire resistant material is extruded or molded to form the fire resistant center panel, and the second fire resistant material is extruded or molded to form a sheet that is then gang ripped to form one or more of the first stile, the second stile, the first rail and the second rail of the extruded fire resistant border. In either embodiment the panels, stiles and rails may undergo one or more finishing steps (e.g., sanding, trimming, cutting, denibbing, etc.) so that the pieces have the proper smoothness, size and shape.

Furthermore, a top panel can be attached to the top of the fire resistant center panel and the extruded fire resistant border, or a bottom panel can be attached to the bottom of the fire resistant center panel, or both the top panel and the bottom panel can be attached to the fire resistant center panel. The top panel or the bottom panel can be a lignocellulosic substrate, a wood, a wood composite, a medium density fiberboard, a high density fiberboard, a particleboard, a masonite, a fiberglass, a metal, a plastic, one or more protective layers or a combination thereof. The one or more protective layers can be a fire resistant material, a blast resistant material, a ballistic resistant material, a shielding material, a chemical resistant material, a biohazard resistant material, a radiation resistant material, a dampening material, a grounding material, insulating material or a combination thereof. For example, the one or more protective layers can be one or more gypsum boards, one or more metallic sheets, one or more lead sheets, one or more Kevlar sheets, one or more ceramic sheets, a layer of urethane foam, a layer of graphite, a wire mesh or a combination thereof.

Referring now to FIG. 17, a flow chart of a method 1700 of manufacturing a door core for a fire rated door in accordance with another embodiment of the present invention is shown. An extruded fire resistant border is provided in block 1702. The extruded fire resistant border has a central void and is manufactured by providing a first stile of the extruded fire resistant border, attaching a first rail of the extruded fire resistant border to the first stile of the extruded fire resistant border, attaching a second rail of the extruded fire resistant border to the first stile and attaching a second stile of the extruded fire resistant border to the first rail and the second rail of the extruded fire resistant border, wherein the extruded fire resistant border is made of a second fire resistant material. The void within the extruded fire resistant border is filled with a first fire resistant material that has a lower density than the second fire resistant material to form a fire resistant center panel in block 1704. The extruded fire resistant border and first fire resistant material are baked or cured to set and fix the material in block 1706. Sanding or other finishing steps may be performed thereafter. An optional step may include forming a fire rated door by attaching a first decorative and a second decorative panel to the top and bottom, respectively, of the extruded fire resistant border and fire resistant center panel in block 1708. Additional elements can be added as described in reference to FIGS. 11-15. An optional step may include coating the fire resistant center panel and the extruded fire resistant border with an intumescent or fire resistant material. Note that the method 1700 can be performed as part of a continuous manufacturing process.

In one embodiment, a notch is formed in the first side of the fire resistant center panel, a fire resistant lock block is inserted within the notch and the fire resistant lock block is attached to the fire resistant center panel and the extruded fire resistant border, wherein the fire resistant lock block is made of the second fire resistant material. In another embodiment, the fire resistant center panel includes: (a) a first fire resistant center panel disposed between the first side and the second side proximate to the first end, wherein the first fire resistant center panel is made of the first fire resistant material; (b) a second fire resistant center panel disposed between the first side and the second side proximate to the second end, wherein the second fire resistant center panel is made of the first fire resistant material; and (c) a fire resistant insert disposed between and attached to the first fire resistant center panel and the second fire resistant center panel, and extending between and attached to the extruded fire resistant border at the first side and the second side, wherein the fire resistant material is made of the second fire resistant material. In yet another embodiment, a set of male-female connectors are formed in the extruded fire resistant border and the fire resistant center panel. The male-female connectors can be triangular-shaped, curved-shaped, rectangular-shaped, angled, tongue-and-groove, or a combination thereof.

In another embodiment, the first fire resistant material is extruded or molded to form the fire resistant center panel, and the second fire resistant material is extruded or molded to form the first stile, the second stile, the first rail and the second rail of the extruded fire resistant border. In yet another embodiment, the first fire resistant material is extruded or molded to form the fire resistant center panel, and the second fire resistant material is extruded or molded to form a sheet that is then gang ripped to form one or more of the first stile, the second stile, the first rail and the second rail of the extruded fire resistant border.

Furthermore, a top panel can be attached to the top of the fire resistant center panel and the extruded fire resistant border, or a bottom panel can be attached to the bottom of the fire resistant center panel, or both the top panel and the bottom panel can be attached to the fire resistant center panel. The top panel or the bottom panel can be a lignocellulosic substrate, a wood, a wood composite, a medium density fiberboard, a high density fiberboard, a particleboard, a masonite, a fiberglass, a metal, a plastic, one or more protective layers or a combination thereof. The one or more protective layers can be a fire resistant material, a blast resistant material, a ballistic resistant material, a shielding material, a chemical resistant material, a biohazard resistant material, a radiation resistant material, a dampening material, a grounding material, insulating material or a combination thereof. For example, the one or more protective layers can be one or more gypsum boards, one or more metallic sheets, one or more lead sheets, one or more Kevlar sheets, one or more ceramic sheets, a layer of urethane foam, a layer of graphite, a wire mesh or a combination thereof.

Now referring to FIG. 18, a flow chart of a method 1800 of manufacturing a fire rated door in accordance with one embodiment of the present invention is shown. A door core as shown in FIGS. 1-10 is provided in block 1802. A first decorative panel is attached to a top of the door core in block 1804, and a second decorative panel is attached to a bottom of the door core in block 1806. Additional elements can be added as described in reference to FIGS. 11-14.

Although preferred embodiments of the present invention have been described in detail, it will be understood by those skilled in the art that various modifications can be made therein without departing from the spirit and scope of the invention as set forth in the appended claims.

What is claimed is:

1. A core for a fire rated door comprising:
    a fire resistant center panel having a bottom, a top, a first side, a second side, a first end and a second end, wherein the fire resistant center panel comprises:
        a first fire resistant panel made of a first fire resistant material comprising gypsum in an amount sufficient to provide fire resistance wherein the amount is 60 to 85% by weight, fibers in an amount of 1.5 to 5% by weight substantially homogeneously distributed through the composite, an aggregate in an amount of 10 to 25% by weight substantially homogeneously distributed through the composite, a starch in an amount of 2 to 7% by weight and a rheology-modifying agent in an amount of 0.5 to 4% by weight,
        a second fire resistant panel made of the first fire resistant material, and
        a fire resistant insert disposed between and attached to the first fire resistant panel and the second fire resistant panel, wherein the fire resistant insert is made of a second fire resistant material comprising gypsum in an amount sufficient to provide fire resistance wherein the amount is 70 to 90% by weight, glass fibers in an amount of 2 to 10% by weight substantially homogeneously distributed through the composite, cellulose fibers in an amount of 2 to 8% by weight substantially homogeneously distributed through the composite, polyvinyl alcohol fibers in an amount of 1 to 4% by weight substantially homogeneously distributed through the composite, polypropylene fibers in an amount of 0.3 to 4% by weight substantially homogeneously distributed through the composite, and a rheology-modifying agent in an amount of 0.5 to 6% by weight; and
    an extruded fire resistant border attached to the first side, the second side, the first end and the second end of the fire resistant center panel, wherein the extruded fire resistant border is made of the second fire resistant material.

2. The core as recited in claim 1, wherein the first fire resistant material further comprises a vermiculite or clay in an amount of 1 to 10% by weight substantially homogeneously distributed through the composite.

3. The core as recited in claim 1, further comprising:
    a notch in the first side of the fire resistant center panel; and
    a fire resistant lock block disposed within the notch and attached to the fire resistant center panel and the extruded fire resistant border, wherein the fire resistant lock block is made of the second fire resistant material.

4. The core as recited in claim 1, wherein the extruded fire resistant border is attached to the fire resistant center panel with a set of male-female connectors formed in the extruded fire resistant border and the fire resistant center panel.

5. The core as recited in claim 4, wherein the male-female connectors are triangular-shaped, curved-shaped, rectangular-shaped, angled, tongue-and-groove, or a combination thereof.

6. The core as recited in claim 4, further comprising a top panel attached to the top of the fire resistant center panel and the extruded fire resistant border, or a bottom panel attached to the bottom of the fire resistant center panel, or both the top panel and the bottom panel.

7. The core as recited in claim 6, wherein the top panel or the bottom panel comprise a lignocellulosic substrate, a wood, a wood composite, a medium density fiberboard, a high density fiberboard, a particleboard, a masonite, a fiberglass, a metal, a plastic, one or more protective layers or a combination thereof.

8. The core as recited in claim 6, wherein the one or more protective layers comprise a fire resistant material, a blast resistant material, a ballistic resistant material, a shielding material, a chemical resistant material, a biohazard resistant material, a radiation resistant material, a dampening material, a grounding material, insulating material or a combination thereof.

9. The core as recited in claim 6, wherein the one or more protective layers comprise one or more gypsum boards, one or more metallic sheets, one or more lead sheets, one or more Kevlar sheets, one or more ceramic sheets, a layer of urethane foam, a layer of graphite, a wire mesh or a combination thereof.

10. The core as recited in claim 9, wherein the fire resistant center panel and the extruded fire resistant border are coated with an intumescent or fire resistant material.

11. The core as recited in claim 9, wherein the fire resistant center panel comprises:
    a center panel made of the first fire resistant material or the second fire resistant material;
    a top insulating panel attached to the top of the center panel; and
    a bottom insulating panel attached to the bottom of the center panel.

12. The core as recited in claim 11, wherein the top insulating panel and the bottom insulating panel are made of a corrugated filler having a plurality of voids filled with an acoustical insulating material.

13. The core as recited in claim 1, wherein the extruded fire resistant border comprises:
   a first stile;
   a second stile;
   a first rail attached to the first stile and the second stile; and
   a second rail attached to the first stile and the second stile.

* * * * *